US012583966B2

(12) United States Patent
Koda et al.

(10) Patent No.: US 12,583,966 B2
(45) Date of Patent: Mar. 24, 2026

(54) CURABLE RESIN, CURED PRODUCT THEREOF, RESIN COMPOSITION, AND METHOD FOR PRODUCING CURABLE RESIN

(71) Applicant: MITSUBISHI GAS CHEMICAL COMPANY, INC., Tokyo (JP)

(72) Inventors: Aiko Koda, Kanagawa (JP); Yoichi Takano, Kanagawa (JP); Shinichi Yonehama, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/837,636

(22) PCT Filed: Feb. 13, 2023

(86) PCT No.: PCT/JP2023/004674
§ 371 (c)(1),
(2) Date: Aug. 12, 2024

(87) PCT Pub. No.: WO2023/157777
PCT Pub. Date: Aug. 24, 2023

(65) Prior Publication Data

US 2025/0136755 A1 May 1, 2025

(30) Foreign Application Priority Data

Feb. 16, 2022 (JP) ................................ 2022-021941

(51) Int. Cl.

| | |
|---|---|
| ***B32B 3/10*** | (2006.01) |
| ***C08G 64/18*** | (2006.01) |
| ***C08G 64/30*** | (2006.01) |
| ***C08J 5/04*** | (2006.01) |
| ***C08J 5/24*** | (2006.01) |
| ***C09K 3/10*** | (2006.01) |

(52) U.S. Cl.
CPC ........... *C08G 64/18* (2013.01); *C08G 64/305* (2013.01); *C08J 5/04* (2013.01); *C08J 5/24* (2013.01); *C09K 3/10* (2013.01); *C08J 2369/00* (2013.01); *C09K 2200/0655* (2013.01)

(58) Field of Classification Search
None
See application file for complete search history.

(56) References Cited

U.S. PATENT DOCUMENTS

| | | | |
|---|---|---|---|
| 2014/0316078 A1 | 10/2014 | Piquera et al. | |
| 2016/0060391 A1 | 3/2016 | Chen et al. | |
| 2017/0044312 A1 | 2/2017 | Kato et al. | |
| 2018/0307052 A1 | 10/2018 | Kato et al. | |

FOREIGN PATENT DOCUMENTS

| | | | |
|---|---|---|---|
| DE | 1568342 A1 | 5/1970 | |
| EP | 3 106 486 A1 | 12/2016 | |
| JP | 5-105746 A | 4/1993 | |
| JP | 2014-210921 A | 11/2014 | |
| JP | 2017-66358 A | 4/2017 | |
| WO | 2015/170691 A1 | 11/2015 | |
| WO | WO-2016202914 A1 * | 12/2016 | ......... C08G 64/0291 |
| WO | 2017/078074 A1 | 5/2017 | |

OTHER PUBLICATIONS

International Search Report, dated Apr. 4, 2023, in International Bureau of WIPO Patent Application No. PCT/JP2023/004674 with an English translation thereof.
Written Opinion, dated Apr. 4, 2023, in International Bureau of WIPO Patent Application No. PCT/JP2023/004674 with an English translation thereof.

* cited by examiner

*Primary Examiner* — Christopher M Polley
(74) *Attorney, Agent, or Firm* — GREENBLUM & BERNSTEIN, P.L.C.

(57) ABSTRACT

A curable resin includes a structural unit represented by the following formula (1), a structural unit represented by the following formula (2), and a structural unit represented by the following formula (3):

(1)

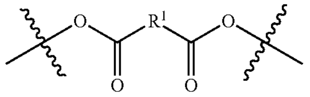

(2)

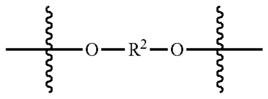

(3)

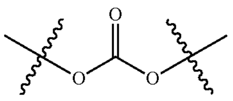

wherein $R^1$ in the formula (1) is a divalent group having one or more of at least one of an ethylenic double bond and an acetylenic triple bond, and $R^2$ in the formula (2) is a divalent group having an alicyclic structure.

26 Claims, No Drawings

CURABLE RESIN, CURED PRODUCT THEREOF, RESIN COMPOSITION, AND METHOD FOR PRODUCING CURABLE RESIN

TECHNICAL FIELD

The present invention relates to a curable resin, a cured product thereof, a resin composition, and a method for producing curable resin.

BACKGROUND ART

Polycarbonate resins are used in various applications due to having excellent mechanical strength, heat resistance, transparency, etc., and various types of polyester carbonates and production methods thereof have been reported.

For example, Patent Literature 1 discloses a polyester carbonate polyol having a norbornane backbone.

Patent Literature 2 discloses a polyester carbonate resin having a 1,1'-binaphthalene structure and a fluorene structure. According to Patent Literature 2, such a resin exhibits excellent optical performance.

Patent Literature 3 discloses a method for producing polyester carbonate resins through a reaction of a reaction product containing a dihydroxy compound having a fluorene structure. According to Patent Literature 3, such a method for producing resins allows resins excellent in flowability and/or tensile strength to be produced.

CITATION LIST

Patent Literature

Patent Literature 1
Japanese Patent Laid-Open No. 05-105746
Patent Literature 2
International Publication No. WO 2015/170691
Patent Literature 3
International Publication No. WO 2017/078074

SUMMARY OF INVENTION

Technical Problem

Although various types of polyester carbonates are known as described above, the polyester carbonates have low compatibility with a curable resin, and therefore are difficult to add to the curable resin. Further, there is room for improvement in the properties of conventional polyester carbonates. Accordingly, an object of the present invention is to provide a curable resin and the like excellent in dielectric properties.

Solution to Problem

As a result of extensive studies, the present inventors have found that a curable resin having specific structural units is excellent in dielectric properties, so that the present invention has been completed.

The present invention includes the following embodiments.

[1]

A curable resin comprising a structural unit represented by the following formula (1), a structural unit represented by the following formula (2), and a structural unit represented by the following formula (3):

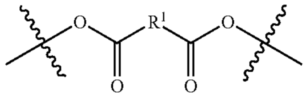
(1)

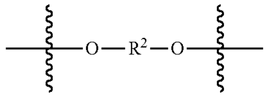
(2)

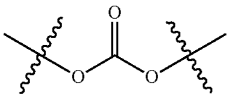
(3)

wherein $R^1$ in the formula (1) is a divalent group having one or more of at least one of an ethylenic double bond and an acetylenic triple bond, and $R^2$ in the formula (2) is a divalent group having an alicyclic structure.

[2]

The curable resin according to item [1], wherein a molar ratio of the total of contents of the structural unit represented by the formula (1), the structural unit represented by the formula (2) and the structural unit represented by the formula (3) to all the structural units constituting the curable resin is 0.60 or more and 1.0 or less.

[3]

The curable resin according to item [1] or [2], wherein the structural unit represented by the formula (3) is derived from at least one selected from the group consisting of a dialkyl carbonate, a diaryl carbonate, and an alkyl aryl carbonate.

[4]

The curable resin according to any one of items [1] to [3], wherein the structural unit represented by the formula (1) is derived from at least one selected from the group consisting of fumaric acid, maleic acid, and maleic anhydride.

[5]

The curable resin according to any one of items [1] to [4], wherein the structural unit represented by the formula (2) is derived from a dihydroxy compound containing at least one selected from the group consisting of a norbornane-based backbone and a cyclohexane-based backbone.

[6]

The curable resin according to any one of items [1] to [5], wherein a molar ratio of the structural unit represented by the formula (1) to the structural unit represented by the formula (2) is 0.010 or more and less than 1.0.

[7]

The curable resin according to any one of items [1] to [6], wherein a molar ratio of the structural unit represented by the formula (3) to the structural unit represented by the formula (2) is 0.10 or more and 1.5 or less.

[8]

The curable resin according to any one of items [1] to [7], having a number average molecular weight of $5.00\times10^2$ or more and $3.00\times10^4$ or less.

[9]

The curable resin according to any one of items [1] to [8], comprising a polyester portion that contains the structural unit represented by the formula (1) and the structural unit represented by the formula (2) and that contains no structural unit represented by the formula (3).

[10]

The curable resin according to any one of items [1] to [9], wherein a dielectric loss tangent calculated according to a measurement method including the following (i) to (iii) is 0.010 or less:

(i) preparing a cured product of a resin composition containing the curable resin, and measuring the dielectric loss tangent at 10 GHz of the cured product;

(ii) conducting the same measurement as in the item (i) on a plurality of cured products with each component content of the resin composition changed; and (iii) extrapolating the measurement results in the items (i) and (ii) to calculate the dielectric loss tangent of the curable resin alone.

[11]

A cured product of the curable resin according to any one of items [1] to [10].

[12]

A resin composition comprising the curable resin according to any one of items [1] to [10].

[13]

The resin composition according to item [12], wherein a content of the curable resin is 1.0 part by mass or more relative to 100 parts by mass of the resin component.

[14]

A method for producing a curable resin, comprising reacting at least one of a compound represented by the following formula (4) and a compound represented by the following formula (4'), a compound represented by the following formula (5), and a compound represented by the following formula (6):

(4)

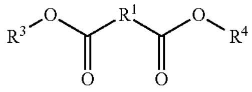

(4')

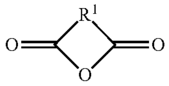

(5)

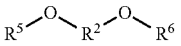

(6)

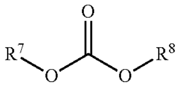

wherein in the formula (4), $R^1$ is a divalent group having one or more of at least one of an ethylenic double bond and an acetylenic triple bond, and $R^3$ and $R^4$ are each independently a hydrogen atom or a monovalent hydrocarbon group having 1 to 7 carbon atoms; in the formula (4'), $R^1$ is defined in the same manner as $R^1$ in the formula (4); in the formula (5), $R^2$ is a divalent group having an alicyclic structure, and $R^5$ and $R^6$ are each independently a hydrogen atom or a monovalent hydrocarbon group having 1 to 7 carbon atoms; and in the formula (6), $R^7$ and $R^8$ are each independently an optional substituent.

[15]

The method for producing a curable resin according to item [14], comprising:

a step of reacting the compound represented by the formula (5) with at least one of the compound represented by the formula (4) and the compound represented by the formula (4') at a molar equivalent less than that of the compound represented by the formula (5), and a step of reacting a resulting product of the step described above with the compound represented by the formula (6).

[16]

The resin composition according to item [12]or [13], for use as an electronic material.

[17]

An electronic component comprising a cured product of the resin composition according to item [12]or [13].

[18]

A fiber-reinforced composite material comprising the resin composition according to item [12]or [13]and a reinforcement fiber.

[19]

A fiber-reinforced formed article being a cured product of the fiber-reinforced composite material according to item [18].

[20]

A semiconductor sealing material comprising the resin composition according to item [12]or [13]and an inorganic filler. [21]

A semiconductor device comprising a cured product of the semiconductor sealing material according to item [20].

[22]

A prepreg comprising a base material and the resin composition according to item [12]or [13]that is impregnated into or applied to the base material.

[23]

A laminate comprising the prepreg according to item [22].

[24]

A circuit board comprising the laminate according to item [23]and a metal foil disposed on one or both surfaces of the laminate.

[25]

A buildup film comprising a cured product of the resin composition according to item [12]or [13]and a base material film.

Advantageous Effect of Invention

According to the present invention, a curable resin and the like excellent in dielectric properties can be provided.

DESCRIPTION OF EMBODIMENTS

Hereinafter, embodiments of the present invention (hereinafter, referred to as "present embodiments") are described in detail. The present invention, however, is not limited thereto, and may be modified without departing from the scope of the gist.

In the present specification, a bond cut with a wavy line in a chemical structural formula means a binding site in a structural unit represented by each chemical structural formula to another structural unit.

[Curable Resin]

A curable resin in the present embodiment includes:

a structural unit represented by the following formula (1) (hereinafter also referred to as "dicarboxylic acid unit"):

(1)

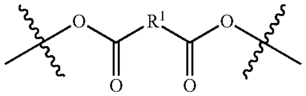

a structural unit represented by the following formula (2) (hereinafter also referred to as "dihydroxy unit"):

(2)

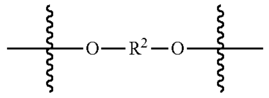

and a structural unit represented by the following formula (3) (hereinafter also referred to as "carbonate unit"):

(3)

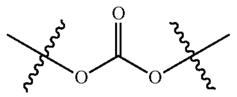

In the formula (1), $R^1$ is a divalent group having one or more of at least one of an ethylenic double bond and an acetylenic triple bond, and in the formula (2), $R^2$ is a divalent group having an alicyclic structure.

Since the curable resin in the present embodiment has one or more of at least one of an ethylenic double bond and an acetylenic triple bond in the dicarboxylic acid unit, crosslinking in a molecule or between molecules is achieved, so that curing may be performed by an appropriate method. A conventional polyester carbonate has no spot (functional group) crosslinkable with a curable resin, causing problems when added to a curable resin having low compatibility, such as phase separation and peeling at an interface with the curable resin. Although the curable resin of the present embodiment is a resin including an ester bond and a carbonate bond, it has one or more of at least one of the ethylenic double bond and the acetylenic triple bond, so that when mixed with another curable resin, the curable resin can react with a functional group of the other curable resin to make a crosslinking. Thereby, the curable resin of the present embodiment can be cured alone, and when mixed with another curable resin, phase separation and interface peeling are unlikely to occur.

Further, the curable resin in the present embodiment includes the dihydroxy unit having an alicyclic structure. It is therefore presumed that a low dielectric constant and dielectric loss tangent are achieved to exhibit excellent dielectric properties. Though it is presumed that the dihydroxy unit has a large molar volume and the alicyclic structure limits the movement of the molecular chain of the resin molecule, the reason is not limited thereto.

In the present specification, having excellent dielectric properties means having both of a low dielectric constant and a low dielectric loss tangent. Although specific values of the dielectric constant and the dielectric loss tangent are not particularly limited, for example, in the case where a cured product of the curable resin or resin composition prepared as in Example has a dielectric constant (relative permittivity) of 2.7 or less and a dielectric loss tangent of 0.010 or less, it can be said that the dielectric properties are excellent. The curable resin and resin composition of the present embodiment are made into a cured product having a low dielectric constant and a low dielectric loss tangent.

The curable resin alone in the present embodiment has a dielectric constant and a dielectric loss tangent of preferably 2.7 or less and 0.010 or less, respectively, calculated according to the measurement method including the following items (i) to (iii):

(i) preparing a cured product of the resin composition containing the curable resin, and measuring the dielectric loss tangent at 10 GHz of the cured product.

(ii) conducting the same measurement as in the item (i) on a plurality of cured products with each component content of the resin composition changed; and (iii) extrapolating the measurement results in the items (i) and (ii) to calculate the dielectric loss tangent of the curable resin alone.

The resin composition in item (i) is not particularly limited, and for example, as in the following Example 7, may include an organic solvent such as toluene, a (meth) acrylate such as tricyclodecanol acrylate, and an initiator such as organic peroxide-based initiator. The cured product may be prepared as follows. A resin composition is fed into a vacuum dryer and dried at normal temperature for 48 hours and at 60° C. for 3 hours to remove solvent. After removal of the solvent, the resin composition is fed into a mold having a thickness of 1 mm, sandwiched between an Aflex film (manufactured by AGC Inc.) and an SUS plate, and fed into a vacuum press heated at 200° C. After the pressure is reduced to 10-2 kPa, the pressing pressure is gradually increased to 0.6 MPa. After heating for 90 minutes, the pressed product is taken out and gradually cooled. After gradual cooling, the cured product of the resin composition is taken out from the mold. The cured product taken out from the mold is cut into a width of 0.8 mm to make samples in a rod shape. The cut samples were dried in a vacuum dryer at 70° C. for one day.

In item (ii), for example, in the case where the resin composition in item (i) contains an organic solvent such as toluene, a (meth)acrylate such as tricyclodecanol acrylate, and an initiator such as an organic peroxide-based initiator as in the following Example 7, at least 4 samples in total including a sample with an increased amount of the initiator added compared to the resin composition in item (i), a sample with a reduced amount of the initiator added compared to the resin composition in item (i), a sample with an increased compounding ratio of (meth)acrylate relative to the curable resin, and a sample with a reduced compounding ratio of (meth)acrylate relative to the curable resin may be prepared.

In item (iii), based on the measurement results in items (i) and (ii), a proportional expression between the content of each component and the dielectric constant and dielectric loss tangent may be calculated to perform the extrapolation based the proportional expression.

The dielectric constant of the curable resin alone in the present embodiment calculated according to the measurement method described above is more preferably 2.6 or less, still more preferably 2.5 or less, and furthermore preferably 2.4 or less. The lower limit of the dielectric constant is not particularly limited, and may be, for example, 1.5, 1.8 or 2.0. The dielectric loss tangent of the curable resin alone in the present embodiment calculated according to the measurement method described above is more preferably 0.008 or less, still more preferably 0.006 or less, and furthermore preferably 0.005 or less. The lower limit of the dielectric loss tangent is not particularly limited, and may be, for example, 0.0005, 0.0003 or 0.0001.

The dielectric constant and the dielectric loss tangent, measured in the same manner as in the following Example 7, of the cured product of the resin composition containing the curable resin in the present embodiment prepared in the same manner as in the following Example 7 are preferably 2.7 or less and 0.010 or less, respectively.

The curable resin in the present embodiment is a resin that cures by responding to an appropriate stimulation, or spontaneously. The curable rein in the present embodiment is a thermosetting resin in one aspect, is a photocurable resin in another aspect, and is a thermosetting or photocurable resin in yet another aspect.

In the dicarboxylic acid unit, $R^1$ is a divalent group having one or more of at least one of an ethylenic double bond and an acetylenic triple bond. In the present specification, the term "ethylenic double bond" means a carbon-carbon double bond having no aromatic ring. On the other hand, the term "acetylenic triple bond" means a carbon-carbon triple bond. Since the curable resin in the present embodiment has such an unsaturated bond between carbons having no aromatic ring, crosslinking is achieved alone or with a crosslinking agent.

The $R^1$ has, for example, 2 or more and 8 or less carbon atoms, preferably 2 or more and 6 or less carbon atoms, more preferably 2 or more and 4 or less carbon atoms, and still more preferably 2 or more and 3 or less carbon atoms, though not particularly limited.

The total number of the ethylenic double bond and the acetylenic triple bond in the $R^1$ is, for example, 1 or more and 3 or less, preferably 1 or more and 2 or less, and still more preferably 1, though not particularly limited as long as it is 1 or more. It is preferable that the $R^1$ have an ethylenic double bond.

Examples of the $R^1$ in a preferred aspect include a divalent hydrocarbon group having 2 or more and 4 or less carbon atoms, with one ethylenic double bond. In the preferred aspect, the number of the ethylenic double bonds and the number of carbons may be optionally replaced within the ranges described above.

In the case where the dicarboxylic acid unit has an ethylenic double bond, the isomer structure is not particularly limited. In other words, the dicarboxylic acid unit having an ethylenic double bond may be in a cis-configuration or in a trans-configuration.

It is preferable that the dicarboxylic acid unit represented by the formula (1) be a structural unit represented by the following formula (1-1) or (1-2):

(1-1)

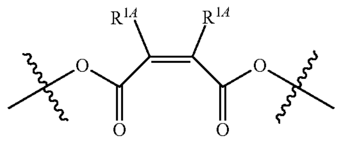

(1-2)

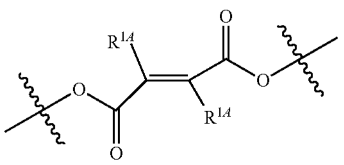

wherein in the formulas (1-1) and (1-2), RIA are each independently a hydrogen atom, a methyl group, or an ethyl group, and preferably each independently a hydrogen atom or a methyl group.

It is particularly preferable that the dicarboxylic acid unit be a structural unit derived from fumaric acid, maleic acid, or maleic anhydride. In this case, $R^1$ in the formula (1) is a divalent hydrocarbon group having two carbon atoms with an ethylenic double bond. With such an aspect, the curable resin tends to have more excellent dielectric properties.

The curable resin in the present embodiment may include only one type of dicarboxylic acid unit or may include two or more types of dicarboxylic acid units. From the viewpoints of easy production and easy control of resin properties, it is preferable that only one type of dicarboxylic acid unit be contained in the curable resin.

$R^2$ in the dihydroxy unit is a divalent group having an alicyclic structure. Since $R^2$ is a divalent group having an alicyclic structure, it is presumed that the curable resin in the present embodiment has a rigid main chain and a large molar volume. As a result, the movement of the molecular chain in the whole resin molecule is restricted, so that improvement in the dielectric properties is presumed. However, the reason of the improvement is not limited thereto. In $R^2$, the alicyclic structure may be in the main chain, in the side chain, or in both the main chain and the side chain. Preferably, $R^2$ has an alicyclic structure in the main chain. Also, $R^2$ has at least one alicyclic structure, and may have two or more alicyclic structures.

The $R^2$ has, for example, 5 or more and 10 or less carbon atoms, preferably 6 or more and 20 or less, more preferably 7 or more and 18 or less, and still more preferably 8 or more and 17 or less carbon atoms. The $R^2$ may have 80 or less, 70 or less, 60 or less, 50 or less, 40 or less or 30 or less carbon atoms in the range described above.

The proportion of the number of carbon atoms constituting the alicyclic structure in the number of carbon atoms contained in $R^2$ is, for example, 50% or more an 100% or less, though not particularly limited. The proportion is preferably 60% or more, more preferably 70% or more, and still more preferably 75% or more, in the range described above. In such an aspect, the movement of the molecular chain in the dihydroxy unit is further restricted, so that the dielectric properties of the curable resin tend to be further improved. The upper limit of the proportion is not particularly limited, and may be, for example, 100%, 95%, 90% or 85%.

The $R^2$ may be a divalent saturated hydrocarbon group, or may be a divalent unsaturated hydrocarbon group.

The dihydroxy unit is preferably a structural unit derived from a dihydroxy compound containing at least one selected from the group consisting of a cycloalkane-based backbone and a norbornane-based backbone, more preferably a structural unit derived from a dihydroxy compound containing at least one selected from the group consisting of a cyclohexane-based backbone and a norbornane backbone, more preferably a structural unit derived from a dihydroxy compound containing at least one selected from the group consisting of a cycloalkane backbone and a norbornane backbone, and still more preferably a structural unit derived from a dihydroxy compound containing at least one selected from the group consisting of a cyclohexane backbone and a norbornane backbone. The dihydroxy unit may be a structural unit derived from a dihydroxy compound containing a norbornane-based backbone, or may be a structural unit derived from a dihydroxy compound containing a norbornane backbone. According to such an aspect, the dielectric properties of the curable resin tend to be further improved. In the present specification, the term "norbornane-based backbone" means a backbone selected from the group consisting of a backbone containing norbornane (bicyclo [2.2.1]heptane) and the backbone of which single bond is substituted with an unsaturated bond. Accordingly, a norbornane-based backbone includes, for example, a norbornane backbone and a norbornene backbone. The term "cycloalkane-based backbone" means a backbone selected from the group consisting of a backbone containing a cycloalkane and the backbone of which single bond is substituted with an unsaturated bond. The cycloalkane-based backbone includes, for example, a cycloalkane backbone and a cycloalkene backbone. The term "cyclohexane-based backbone" means a backbone selected from the group consisting of a backbone containing cyclohexane and the backbone of which single bond is substituted with an unsaturated bond. The cyclohexane-based backbone includes, for example, a cyclohexane backbone and a cyclohexene backbone.

The dihydroxy unit represented by the formula (2) is preferably a structural unit represented by the following formula (2-4), and more preferably a structural unit represented by the following formula (2-1), (2-2) or (2-3). Alternatively, the structural unit may include a structure in which $R^{2A}$ and/or $R^{2B}$ and/or $R^{2C}$ and/or $R^{2D}$ repeat regularly or randomly between oxygen atoms at ends:

(2-1)

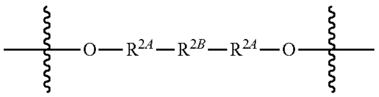

(2-2)

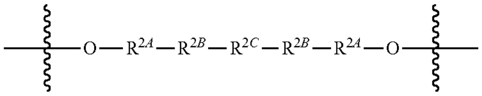

(2-3)

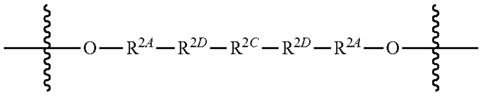

(2-4)

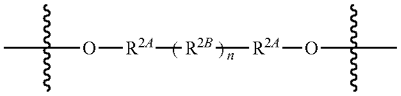

wherein in the above formulas, $R^{2A}$ are each independently a single bond, a methylene group, or an ethylene group; $R^{2B}$ is a divalent alicyclic structure having 5 or more and 30 or less carbon atoms, 5 or more and 20 or less carbon atoms, or 5 or more and 15 or less carbon atoms, which may have an alkyl group; $R^{2C}$ are each independently a single bond or a methylene group or ethylene group which may have at least one of a methyl group and an ethyl group; $R^{2D}$ are each independently a divalent aryl group; $R^{2X}$ are each independently $R^{2A}$, $R^{2B}$, $R^{2C}$ or $R^{2D}$; and n is an integer of 1 or more and 6 or less; wherein in the formula (2-4), among n pieces of $R^{2X}$, at least one is $R^{2B}$.

In the formulas, preferably, $R^{2A}$ are each independently a single bond or a methylene group.

In the formulas, $R^{2B}$ may be a monocyclo ring, a bicyclo ring, a tricyclo ring, or a polycyclo ring which may have an alkyl group. $R^{2B}$ preferably contains a cycloalkane-based backbone or a norbornane-based backbone, more preferably contains a cyclohexane-based backbone or a norbornane-based backbone, still more preferably contains a cyclohexane ring or a norbornane-based backbone, furthermore preferably contains a cyclohexane ring or a norbornane backbone, and particularly preferably contains a cyclohexane ring and a decahydro-1, 4:5,8-dimethanonaphthalene backbone represented by the following formula (7). In the case of $R^{2B}$ containing a cycloalkane-based backbone, a cyclohexane-based backbone, a cyclohexane ring, a norbornane-based backbone, a norbornane backbone and/or a decahydro-1, 4:5,8-dimethanonaphthalene backbone, a group bonding to $R^{2B}$ may bond to any portion of the backbone or the ring, or may bond to another cyclo ring further bonding to the backbone.

(7)

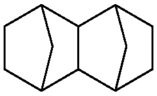

The alkyl group that $R^{2B}$ may have is preferably a methyl group or an ethyl group, though not particularly limited. $R^{2B}$ may have a divalent alicyclic structure having no alkyl group. The alicyclic structure of $R^{2B}$ may have 0 or more and 6 or less, 0 or more and 4 or less, 0 or more and 3 or less, 0 or more and 2 or less, or 0 or more and 1 or less alkyl groups.

In the formula, examples of the methylene group or ethylene group of $R^{2C}$ that may have at least one of a methyl group and an ethyl group include a methylene group, an ethylene group, a methyl methylene group, an ethyl methylene group, a methyl ethylene group, an ethyl ethylene group, a methylethyl methylene group, a dimethyl methylene group, a diethyl methylene group, a methylethyl ethylene group, dimethyl ethylene group, a diethyl ethylene group, a methyl diethyl ethylene group, a dimethyl ethyl ethylene group, a trimethyl ethylene group, a triethyl ethylene group, and a tetramethyl ethylene group; being preferably selected from a methylene group, an ethylene group, a methyl methylene group, an ethyl methylene group, a methyl ethylene group, an ethyl ethylene group, a methyl ethyl methylene group, a dimethyl methylene group, a diethyl methylene group, a methyl ethyl ethylene group, a dimethyl ethylene group, and a diethyl ethylene group; and being more preferably selected from a methylene group, an ethylene group, a methyl methylene group, an ethyl methylene group, a methyl ethylene group, an ethyl ethylene group, a methyl ethyl methylene group, a dimethyl methylene group, and a diethyl methylene group.

In the formula, $R^{2D}$ is preferably a benzene ring or a naphthalene ring that may have an alkyl group, and more preferably a benzene ring that may have an alkyl group. The alkyl group that $R^{2D}$ may have is preferably a methyl group or an ethyl group, though not particularly limited. $R^{2D}$ may be a divalent aromatic ring having no alkyl group. The aromatic ring of $R^{2D}$ may have 0 or more and 6 or less, 0 or more and 4 or less, 0 or more and 3 or less, 0 or more and 2 or less, or 0 or more and 1 or less alkyl groups.

In the formula, $(R^{2X})^n$ has a structure in which n pieces of $R^{2X}$ each independently selected from the divalent groups $R^{2A}$, $R^{2B}$, $R^{2C}$ and $R^{2D}$ are bonded. The preferred aspect of $R^{2A}$, $R^{2B}$, $R^{2C}$ and $R^{2D}$ in $(R^{2X})_n$ is the same as described above. Examples of $(R^{2X})_n$ include the following structures, though not particularly limited.

$—R^{2B}—$ $—R^{2B}—R^{2C}—$ $—R^{2B}—R^{2D}—$ $—R^{2D}—R^{2B}—R^{2D}—$ $—R^{2B}—R^{2A}—R^{2B}—$ $—R^{2B}—R^{2C}—R^{2B}—$ $—R^{2B}—R^{2D}—R^{2B}—$

The number of $R^{2B}$ contained in ($R^{2X}$), may be 1 or more and 4 or less, preferably 1 or more and 3 or less, and more preferably 1 or 2. Preferably, n is 1 or more and 5 or less, more preferably 1 or more and 4 or less, and still more preferably 1 or more and 3 or less.

The dihydroxy unit represented by the formula (2) may be a unit derived from a dihydroxy compound having an alkylene group with 3 or more and 20 or less carbon atoms as main chain, with a group having an alicyclic structure bonded to a side chain of the alkylene group. The alicyclic structure in the group bonded to a side chain may be, for example, a monocyclo ring, a bicyclo ring, a tricyclo ring, or a polycyclo ring. The group bonded to the side chain may be a cycloalkyl group such as cyclohexyl group or a monovalent group derived from a norbornane-based backbone. In the aspect, the dihydroxy unit may have 5 or more and 100 or less carbon atoms.

It is particularly preferred that the dihydroxy unit be at least one selected from the group consisting of the structural units derived from any one of decahydro-1, 4:5,8-dimethanonaphthalene-dimethanol (D-NDM), tricyclodecane dimethanol (for example, tricyclo[5.2.1.$0^{2,6}$]decane dimethanol represented by the following formula (10)) (TCDDM), cyclohexane dimethanol, pentacyclopentadecane dimethanol (for example, penta cyclo [6.5.1.$1^{3,6}$.$0^{2,7}$.$0^{9,13}$] pentadecane dimethanol (PCDDM) represented by the following formula (12), hydrogenated bisphenol A, and (trimethyl cyclohexylidene)bisphenol (TMC).

In the compound, the bonding position of the group bonding to an alicyclic structure is not particularly limited. For example, in D-NDM, the position where the hydroxymethyl group bonds to the alicyclic structure is not particularly limited, and may be, for example, $2^{nd}$ and $6^{th}$ positions or $2^{nd}$ and $7^{th}$ positions. In cyclohexane dimethanol, the bonding position of the hydroxymethyl group bonding to a cyclohexane ring is not particularly limited, and may be, for example, an ortho position, a meta position or a para position. In TMC, the bonding positions of the three methyl groups and the two phenol groups to the cyclohexane ring are not particularly limited, and for example, TMC may be (3,3,5-trimethylcyclohexylidene)bisphenol or may be 4,4'-(3,3,5-trimethylcyclohexylidene)bisphenol represented by the following formula (14).

The curable resin in the present embodiment may contain only one type of dihydroxy unit, or may contain two or more types of dihydroxy units. Further, each of the dihydroxy units may include one type of stereoisomer, or may include a plurality of stereoisomer.

It is preferable that the carbonate unit be a structural unit derived from at least one selected from the group consisting of a dialkyl carbonate, a diaryl carbonate, and an alkyl aryl carbonate. Specific examples of the dialkyl carbonate, the diaryl carbonate, and the alkyl aryl carbonate are described as follows.

The curable resin in the present embodiment may further include a structural unit in addition to the dicarboxylic acid unit, the dihydroxy unit, and the carbonate unit. The further unit is preferably one that has no negative impact on the dielectric properties of the curable resin, though not particularly limited. Examples of the further structural unit include a structural unit derived from a dicarboxylic acid compound not applicable to the formula (1), a structural unit derived from a dihydroxy compound not applicable to the formula (2), and a monohydroxy compound having an ethylenic double bond.

Example of such a dicarboxylic acid compound include a saturated aliphatic dicarboxylic acid, an aromatic dicarboxylic acid and an acid anhydride thereof, though not particularly limited.

Examples of the saturated aliphatic dicarboxylic acid include cyclohexanedicarboxylic acid, cyclopentanedicarboxylic acid, adipic acid, succinic acid, sebacic acid, alkylsuccinic acid, cyclohexane diacetic acid, azelaic acid, malonic acid, dimethylmalonic acid and oxalic acid.

Examples of the aromatic dicarboxylic acid include terephthalic acid, isophthalic acid, 1,4-naphthalenedicarboxylic acid, 2,6-naphthalenedicarboxylic acid, 2,7-naphthalenedicarboxylic acid, biphenyldicarboxylic acid, 5-tert-butyl-1,3-benzenedicarboxylic acid, 2,5-furandicarboxylic acid, and 2,5-thiophenedicarboxylic acid.

Also, examples of such a dihydroxy compound include an aliphatic dihydroxy compound and an aromatic dihydroxy compound, though not particularly limited.

Examples of the aliphatic dihydroxy compound include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, and 1,10-decanediol.

Examples of the aromatic dihydroxy compound include hydroquinone, resorcin, 4,4'-dihydroxybiphenyl, xylylene glycol, 4,4'-dihydroxydiphenyl benzophenone, and bisphenols. Examples of bisphenols include 2,2-bis(4-hydroxyphenyl) propane, 2,2-bis(3-methyl-4-hydroxyphenyl) propane, 2,2-bis(4-hydroxy-3,5-dimethylphenyl) propane, 2,2-bis(4-hydroxy-3,5-diethylphenyl) propane, 2,2-bis(4-hydroxy-(3-phenyl)phenyl) propane, 2,2-bis(4-hydroxy-(3,5-diphenyl) phenyl) propane, 2,2-bis(4-hydroxy-3,5-dibromophenyl) propane, bis(4-hydroxyphenyl) methane, 1,1-bis(4-hydroxyphenyl) ethane, 2,2-bis(4-hydroxyphenyl) butane, 2,2-bis(4-hydroxyphenyl) pentane, 1,1-bis(4-hydroxyphenyl)-1-phenylethane, bis(4-hydroxyphenyl)diphenylmethane, 1,1-bis(4-hydroxyphenyl)-2-ethylhexane, 1,1-bis(4-hydroxyphenyl) decane, bis(4-hydroxy-3-nitrophenyl) methane, 3,3-bis(4-hydroxyphenyl) pentane, 1,3-bis(2-(4-hydroxyphenyl)-2-propyl)benzene, 1,3-bis(2-(4-hydroxyphenyl)-2-propyl)benzene, 2,2-bis(4-hydroxyphenyl) hexafluoro propane, 1,1-bis(4-hydroxyphenyl)cyclohexane, bis(4-hydroxyphenyl) sulfone, 2,4'-dihydroxydiphenylsulfone, bis(4-hydroxyphenyl) sulfide, bis(4-hydroxy-3-methylphenyl) sulfide, bis(4-hydroxyphenyl)disulfide, 4,4'-dihydroxydiphenyl ether, 4,4'-dihydroxy-3,3'-dichlorodiphenyl ether, and 4,4'-(propane-2,2-diyl)bis(2-allylphenol).

Also, examples of the aromatic dihydroxy compound include a dihydroxy compound having an ether group bonded to an aromatic group such as 2,2-bis(4-(2-hydroxyethoxy)phenyl) propane, 2,2-bis(4-(2-hydroxypropoxy)phenyl) propane, 1,3-bis(2-hydroxyethoxy)benzene, 4,4'-bis(2-hydroxyethoxy) biphenyl, and bis(4-(2-hydroxyethoxy) phenyl) sulfone; and a dihydroxy compound having a fluorene ring such as 9,9-bis(4-(2-hydroxyethoxy)phenyl) fluorene, 9,9-bis(4-hydroxyphenyl) fluorene, 9,9-bis(4-hydroxy-3-methylphenyl) fluorene, 9,9-bis(4-(2-hydroxypropoxy)phenyl) fluorene, 9,9-bis(4-(2-hydroxyethoxy)-3-methylphenyl) fluorene, 9,9-bis(4-(2-hydroxypropoxy)-3-methylphenyl) fluorene, 9,9-bis(4-(2-hydroxyethoxy)-3-isopropylphenyl) fluorene, 9,9-bis(4-(2-hydroxyethoxy)-3-isobutylphenyl) fluorene, 9,9-bis(4-(2-hydroxyethoxy)-3- tert-butylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, 9,9-bis(4-(2-hydroxyethoxy)-3,5-dimethylphenyl) fluorene, 9,9-bis(4-(2-hydroxyethoxy)-3-tert-butyl-6-methylphenyl) fluorene, and 9,9-bis(4-(3-hydroxy-2,2-dimethylpropoxy)phenyl) fluorene.

Examples of the monohydroxy compound having an ethylenic double bond include a hydroxy group-containing (meth)acrylate, and specific examples thereof include 2-hydroxyethyl (meth)acrylate, 3-hydroxypropyl (meth)acrylate, 4-hydroxybutyl (meth)acrylate, trimethylolpropane di(meth)acrylate, and pentaerythritol tri(meth)acrylate.

Also, the curable resin may contain a substructure such as a structure derived from a silicone oil having a hydroxy group in a molecular structure, and a silicone oil having a carboxy group in a molecular structure.

As the silicone oil having a hydroxy group in the molecular structure, a commercially available product may be used, and examples thereof include "KF-6001" (functional group equivalent: 900) and "KF-6002" (functional group equivalent: 1600) having a hydroxy group at both ends and "X-22-1821" (functional group equivalent: 1470) having a phenolic hydroxy group at both ends (the above, manufactured by Shin-Etsu Chemical Co., Ltd.), "BY-16-752A" (functional group equivalent: 1500) having a hydroxy group at both ends (the above, manufactured by DuPont Toray Specialty Materials K.K.), "X-22-170BX" (functional group equivalent: 2800), "X-22-170DX" (functional group equivalent: 4670), "X-22-176DX" (functional group equivalent: 1600), and "X-22-176F" (functional group equivalent: 6300) having a hydroxy group at one end (the above, manufactured by Shin-Etsu Chemical Co., Ltd.), "X-22-4039" (functional group equivalent: 970) and "X-22-4015" (functional group equivalent: 1870) having a hydroxy group at a side chain (the above, manufactured by Shin-Etsu Chemical Co., Ltd.); "SF8427" (functional group equivalent: 930, manufactured by DuPont Toray Specialty Materials K.K.) and "X-22-4952" (functional group equivalent: 1100, manufactured by Shin-Etsu Chemical Co., Ltd.) having a hydroxy group in a both-end polyether; and "FZ-2162" (functional group equivalent: 750) and "SH3773M" (functional group equivalent: 800) having a hydroxy group in a side-chain polyether (the above, manufactured by DuPont Toray Specialty Materials K.K.).

As the silicone oil having a carboxy group in the molecular structure, a commercially available product may be used, and examples thereof include "X-22-162C" (functional group equivalent: 2300) having a carboxy group at both ends, "X-22-3710" (functional group equivalent: 1450) having a carboxy group at one end, and "X-22-3701E" (functional group equivalent: 4000) having a carboxy group at a side chain (the above, manufactured by Shin-Etsu Chemical Co., Ltd.).

Through introduction of the structural unit and/or substructure as described above into the curable resin of the present embodiment, properties such as flexibility, mechanical strength, heat resistance, flame retardancy, color tone, and solubility in solvent tend to be improved or imparted.

The end group in the curable resin of the present embodiment is not particularly limited and may be, for example, a carboxy group and/or hydroxy group. It is preferable that the end group have a structure with a carboxy group and/or hydroxy group capped by an end capping agent. In one aspect having an end capping agent, the curable resin tends to have more excellent dielectric properties.

The capping agent for an end carboxy group is not particularly limited, as long as it has a group reactive with the carboxy group, and examples thereof include a carbodiimide compound such as monocarbodiimide and polycarbodiimide compounds, oxazoline compounds and one-end diols.

Examples of the capping agent for an end hydroxy group include diphenyl carbonate and monocarboxylic acid.

The curable resin in the present embodiment contains the dicarboxylic acid unit, the dihydroxy unit, and the carbonate unit. Although the bonding sequence of these units are not particularly limited, it is preferable that the dicarboxylic acid unit and the carbonate unit neighbor to the dihydroxy unit. In the curable resin, the oxygen that these units have at both ends is shared with the neighboring unit. In other words, for example, in the case where the dihydroxy unit neighbors to the dicarboxylic acid, the structure includes the following ester bond.

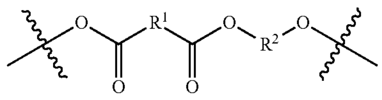

In the case where the dihydroxy unit neighbors to the carbonate unit, the structure includes the following carbonate bond.

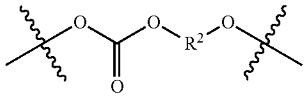

The curable resin in the present embodiment may be a random copolymer of the dicarboxylic acid unit, the dihydroxy unit, and the carbonate unit, may be a copolymer including a copolymer of the carbonate unit and the dihydroxy unit connected to the dicarboxylic acid unit, or may be a copolymer including a copolymer of the dicarboxylic acid unit and the dihydroxy unit connected to the carbonate unit.

In one aspect, the curable resin in the present embodiment contains a polyester portion that contains the dihydroxy unit and the dicarboxylic acid unit and that contains no carbonate unit. In the aspect, it is preferable that the curable resin be a polyester carbonate in which a plurality of polyester portions include the dihydroxy unit and the dicarboxylic acid unit connected to a plurality of the carbonate units. According to such an aspect, the dielectric properties of the curable resin tend to be further improved.

The molar ratio of the dicarboxylic acid unit content $N_{COOH}$ to the dihydroxy unit content $N_{OH}$, i.e. $N_{COOH}/N_{OH}$, is preferably 0.010 or more and less than 1.0, more preferably 0.025 or more and 0.50 or less, still more preferably 0.050 or more and 0.30 or less, and furthermore preferably 0.75 or more and 0.20 or less. With a molar ratio $N_{COOH}/N_{OH}$ in the range, the dielectric properties tend to be further improved. The molar ratio $N_{COOH}/N_{OH}$ may be measured by nuclear magnetic resonance (NMR).

The molar ratio of the carbonate unit content $N_{OCOO}$ to the dihydroxy unit content Now, i.e. $N_{OCOO}/N_{OH}$, is preferably 0.10 or more and 1.5 or less, more preferably 0.50 or more and 1.3 or less, still more preferably 0.80 or more and 1.1 or less, and furthermore preferably 0.85 or more and 1.05 or less. With a molar ratio $N_{OCOO}/N_{OH}$ in the range, the dielectric properties tend to be further improved. The molar ratio $N_{OCOO}/N_{OH}$ may be measured by nuclear magnetic resonance (NMR).

The molar ratio of the total of the content of the dihydroxy unit, dicarboxylic acid unit and carbonate unit to all the structural units constituting the curable resin in the present embodiment $N_{all}$, i.e. $(N_{OH}+N_{COOH}+N_{OCOO})/N_{all}$, is preferably 0.60 or more, more preferably 0.70 or more, still more preferably 0.80 or more, and furthermore preferably 0.90 or more. The upper limit of the molar ratio $(N_{OH}+N_{COOH}+N_{OCOO})/N_{all}$ may be, for example, 1.0, 0.98 or 0.96, though not particularly limited. With a molar ratio $(N_{OH}+N_{COOH}+N_{OCOO})/N_{all}$ of 0.60 or more, the dielectric properties, solubility and bleed-out resistance, etc. of the curable resin in the present embodiment tend to be further improved. The molar ratio $(N_{OH}+N_{COOH}+N_{OCOO})/N_{all}$ may be measured by nuclear magnetic resonance (NMR).

From the viewpoint of further improving the dielectric properties, the solubility in solvent, the bleed-out resistance, etc. of the curable resin, the proportion of the structural unit represented by the formula (1) in all the structural units derived from the dicarboxylic acid compound in the curable resin is preferably 0.60 or more, more preferably 0.70 or more, still more preferably 0.80 or more, and furthermore preferably 0.90 or more. The upper limit of the proportion may be, for example, 1.0, 0.98 or 0.96, though not particularly limited.

From the same viewpoint, the proportion of the structural unit represented by the formula (2) in all the structural units derived from the dihydroxy compound in the curable resin is preferably 0.60 or more, more preferably 0.70 or more, still more preferably 0.80 or more, and furthermore preferably 0.90 or more. The upper limit of the proportion may be, for example, 1.0, 0.98 or 0.96, though not particularly limited.

The proportion of the structural unit represented by the formula (1) and the proportion of the structural unit represented by the formula (2) may be measured by a nuclear magnetic resonance apparatus (NMR).

The content of the structural unit derived from each monomer may be controlled through adjustment of the amount charged (amount used) of each monomer in production of the curable resin. On this occasion, it is preferable that a greater amount of a monomer that easily evaporates to flow out of the system be used in comparison with a monomer that is unlikely to evaporate, in consideration of the flow out from the system.

The number average molecular weight of the curable resin of the present invention is preferably $5.00\times10^2$ or more and $3.00\times10^4$ or less, more preferably $1.00\times10^3$ or more and $2.00\times10^4$ or less, still more preferably $1.50\times10^3$ or more and $1.50\times10^4$ or less and furthermore preferably $3.00\times10^3$ or more and $1.00\times10^4$ or less. With a number average molecular weight of $3.00\times10^4$ or less, the solubility in solvent for the curable resin tends to be further improved. Accordingly, in one aspect with a number average molecular weight of $3.00\times10^4$ or less, the curable resin is suitably used for impregnation into filler (for example, glass cloth) of a copper clad laminate or the like, or for dissolving in a solvent such as an unsaturated polyester. Further, in the case where the curable resin has a number average molecular weight of $3.00\times10^4$ or less, when mixed with another curable resin such as a maleimide resin and cured, occurrence of bleed out (a phenomenon in which no homogeneous reaction of the resin occurs with visible aggregation of a same composition) tends to be surely prevented.

On the other hand, with a number average molecular weight of the curable resin of $5.00\times10^2$ or more, the dihydroxy units are incorporated sufficiently into the resin, so that the dielectric properties tend to be further improved. The number average molecular weight may be measured by gel permeation chromatography (GPC).

The curable resin in the present embodiment includes all the aspects of curable resins to be obtained through any combination of all the aspects described above.

The curable resin in the present embodiment may be produced by reacting a compound including the dicarboxylic acid unit, a compound including the dihydroxy unit and a compound including the carbonate unit.

<Method for Producing Curable Resin>

An embodiment of the present invention relates to a method for producing a curable resin.

The method for producing a curable resin in the present embodiment includes the step of reacting:

at least one of a compound represented by the following formula (4) (hereinafter also referred to as "dicarboxylic acid compound") and a compound represented by the following formula (4') (hereinafter also referred to as "dicarboxylic anhydride"), (4)

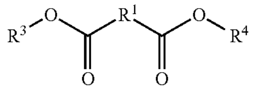

(4')

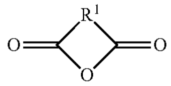

a compound represented by the following formula (5) (hereinafter also referred to as "dihydroxy compound"), (5)

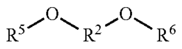

and a compound represented by the following formula (6) (hereinafter also referred to as "carbonate compound").

(6)

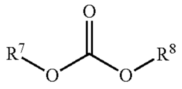

In the formula (4), $R^1$ is a divalent group having one or more of at least one of an ethylenic double bond and an acetylenic triple bond, and $R^3$ and $R^4$ are each independently a hydrogen atom or a monovalent hydrocarbon group having 1 to 7 carbon atoms; in the formula (4'), $R^1$ is defined in the same manner as $R^1$ in the formula (4); in the formula (5), $R^2$ is a divalent group having an alicyclic structure, and $R^5$ and $R^6$ are each independently a hydrogen atom or a monovalent hydrocarbon group having 1 to 7 carbon atoms; and in the formula (6), $R^7$ and $R^8$ are each independently an optional substituent.

In the method for producing a curable resin in the present embodiment, the dicarboxylic acid compound or the dicarboxylic anhydride is reacted to be incorporated into the resin, so that the dicarboxylic acid unit of the curable resin in the present embodiment is produced. In the same manner, the dihydroxy compound and the carbonate compound are reacted to be incorporated into the resin, the dihydroxy unit and the carbonate unit in the present embodiment are produced, respectively. In other words, the dicarboxylic acid unit, the dihydroxy unit and the carbonate unit of the curable resin in the present embodiment are the structural units derived from the dicarboxylic acid compound or dicarboxylic anhydride, the dihydroxy compound and the carbonate compound, respectively.

$R^1$ in the formulas (4) and (4') and $R^2$ in the formula (5) are defined in the same manner as in $R^1$ in the formula (1) and $R^2$ in the formula (2), respectively, and the preferred aspect is also as described above.

$R^3$, $R^4$, $R^5$ and $R^6$ in the dicarboxylic acid compound and dihydroxy compound are each independently a hydrogen atom or a monovalent hydrocarbon group having 1 to 7 carbon atoms. When the dicarboxylic acid compound or the dihydroxy compound is incorporated into the resin through the reaction, $R^3$—OH, $R^4$—OH, $R^5$—OH and $R^6$—OH corresponding to the $R^3$, $R^4$, $R^5$ and $R^6$ are eliminated, so that the reaction proceeds. Accordingly, $R^3$, $R^4$, $R^5$ and $R^6$ are preferably groups of which hydroxides have high stability. Further, from the viewpoint of enhancing reactivity, $R^3$, $R^4$, $R^5$ and $R^6$ are preferably groups having a small steric hindrance.

The $R^3$, $R^4$, $R^5$ and $R^6$ are each independently preferably a hydrogen atom, a methyl group, an ethyl group, an n-propyl group, an isopropyl group, an n-butyl group, an isobutyl group, a phenyl group, or a benzyl group, more preferably a hydrogen atom, a methyl group, an ethyl group, or a phenyl group, still more preferably a hydrogen atom or a methyl group, and particularly preferably a hydrogen atom.

In a preferred aspect of the method for producing a curable resin in the present embodiment, a dicarboxylic anhydride is used and a dihydroxy compound in which $R^5$ and $R^6$ are hydrogen atoms is used. In another preferred aspect of the method for producing a curable resin in the present embodiment, a dicarboxylic acid compound in which $R^3$ and $R^4$ are hydrogen atoms or a dihydroxy compound in which $R^5$ and $R^6$ are hydrogen atoms is used. According to such an aspect, a curable resin tends to be efficiently produced.

$R^7$ and $R^8$ in the carbonate compound are each independently an optional substituent. When the carbonate compound incorporated into the resin through the reaction, $R^7$—OH and $R^8$—OH corresponding to the $R^7$ and $R^8$ are eliminated, so that the reaction proceeds. Accordingly, $R^7$ and $R^8$ are preferably groups of which hydroxides have high stability. Further, $R^7$ and $R^8$ are preferably selected such that the carbonate compound is a stable compound.

The $R^7$ and $R^8$ are preferably alkyl groups or aryl groups, more preferably alkyl groups having 1 to 6 carbon atoms or aryl groups having 6 to 12 carbon atoms, still more preferably alkyl groups having 1 to 3 carbon atoms or aryl groups having 6 carbon atoms (phenyl group), and furthermore preferably a phenyl group.

The carbonate compound is not particularly limited, and examples of thereof include diphenyl carbonate, ditolyl carbonate, dimethyl carbonate, diethyl carbonate, di-t-butyl carbonate, bis(chlorophenyl) carbonate, m-cresyl carbonate, and dichlorohexyl carbonate. The carbonate compound is preferably diphenyl carbonate and/or an alkyl group-substituted diphenyl carbonate.

The dicarboxylic acid compound, dicarboxylic acid anhydride, dihydroxy compound and carbonate compound may be used alone or may be used in combination of two or more.

In the method for producing a curable resin in the present embodiment, a monomer, an oligomer or a polymer other than the dicarboxylic acid compound represented by the formula (4), the dicarboxylic anhydride represented by the formula (4'), the dihydroxy compound represented by the formula (5) and the carbonate compound represented by the formula (6) may be added to a reaction system to be incorporated into the curable resin. Examples of such a compound include a dicarboxylic acid compound other than the dicarboxylic acid compound represented by the formula (4) and an acid anhydride thereof, a dihydroxy compound other than the dihydroxy compound represented by the formula (5), a monohydroxy compound having an ethylenic double bond, a silicone oil having a hydroxy group in the molecular structure, and a silicone oil having a carboxy group in the molecular structure. Examples of these compounds include ones described in detail in the explanation of the curable resin in the present embodiment, which may be used alone or may be used in combination of two or more.

It is preferable that the amount of the dicarboxylic acid compound, dicarboxylic anhydride, dihydroxy compound and carbonate compound used be adjusted such that the molar ratios $N_{COOH}/N_{OH}$ and $N_{OCOO}/N_{OH}$ in the curable rein in the present embodiment are in the preferred ranges described above.

In other words, the molar ratio of the total amount of the dicarboxylic acid compound and dicarboxylic anhydride used relative to the amount of dihydroxy compound is preferably 0.010 or more and less than 1.0, more preferably 0.025 or more and 0.50 or less, still more preferably 0.050 or more and 0.30 or less, and furthermore preferably 0.075 or more and 0.20 or less.

The molar ratio of the amount of the carbonate compound used relative to the amount of the dihydroxy compound used is preferably 0.10 or more and 1.5 or less, more preferably 0.50 or more and 1.3 or less, still more preferably 0.80 or more and 1.1 or less, and furthermore preferably 0.85 or more and 1.05 or less. Incidentally, regarding the amount of each compound used, the amount of a compound that evaporates more easily used may be increased using the easiness of evaporation of each compound as index (for example, saturated vapor pressure at the reaction temperature).

In the method for producing the curable resin of the present embodiment, the proportion of the total amount used of the dicarboxylic acid compound, dicarboxylic anhydride, dihydroxy compound and carbonate compound in the total amount of the compounds for use, represented by molar ratio, is preferably 0.60 or more, more preferably 0.70 or more, still more preferably 0.80 or more, and furthermore preferably 0.90 or more. The upper limit of the proportion may be, for example, 1.0, 0.98, or 0.96, though not particularly limited. With a proportion of 0.60 or more, a curable resin further excellent in the dielectric properties, solubility in solvent, bleed-out resistance, etc. tends to be produced.

From the viewpoint of producing a curable resin further excellent in the dielectric properties, solubility in solvent, bleed-out resistance, etc., the proportion of the amount of used of the dicarboxylic acid compound represented by the formula (4) or (4') and a dicarboxylic anhydride in all of the compounds having 2 carboxylic groups and anhydrides thereof for use in the production method of the present embodiment is preferably 0.60 or more, more preferably 0.70 or more, still more preferably 0.80 or more, and furthermore preferably 0.90 or more. The upper limit of the proportion may be, for example, 1.0, 0.98 or 0.96, though not particularly limited.

From the same viewpoint, the proportion of the amount used of the dihydroxy compound represented by the formula (5) in all the compounds having 2 hydroxy groups for use in the production method of the present embodiment is preferably 0.60 or more, more preferably 0.70 or more, still more preferably 0.80 or more, and furthermore preferably 0.90 or more. The upper limit of the proportion may be, for example, 1.0, 0.98 or 0.96, though not particularly limited.

In one aspect, the method for producing a curable resin in the present embodiment may include a step 1A of reacting at least one of a dicarboxylic acid compound and a dicarboxylic anhydride and a dihydroxy compound, and a step 1B of reacting a resulting product of the step 1A and a carbonate compound.

In the step 1A, the total amount of the dicarboxylic acid compound and dicarboxylic anhydride used is preferably less than the amount of the dihydroxy compound used in terms of moles. In such an aspect, a polyol compound produced in the step 1A tends to suitably react with the carbonate compound in the step 1B.

In the step 1B, it is preferable that the amount of the carbonate compound used in terms of moles be more than the number of moles obtained by subtracting the total amount of the dicarboxylic acid compound and the dicarboxylic anhydride used from the amount of the dihydroxy compound used. In such an aspect, the amount of the carbonate compound used is more than the number of hydroxy group of the resulting product of the step 1A, so that the amount of the hydroxy group at an end of the resulting curable resin can be reduced. As a result, a curable resin having more excellent dielectric properties tends to be obtained.

In another aspect, the method for producing a curable resin in the present embodiment may include a step 2A of reacting a carbonate compound and a dihydroxy compound, and a step 2B of reacting a resulting product of the step 2A and at least one of a dicarboxylic acid compound and a dicarboxylic anhydride.

In the step 2A, the amount of the carbonate compound used is preferably less than the amount of the dihydroxy compound used in terms of moles. In such an aspect, a polyol compound produced in the step 2A tends to suitably react with the dicarboxylic acid compound and/or the dicarboxylic anhydride in the step 2B.

In the step 2B, it is preferable that the total amount of the dicarboxylic acid compound and the dicarboxylic anhydride used in terms of moles be about the same as the number of moles obtained by subtracting the amount of the carbonate compound used from the amount of the dihydroxy compound used. In such an aspect, the amount of the dicarboxylic acid compound and/or dicarboxylic anhydride used is about the same as the number of hydroxy group of the resulting product of the step 2A, so that the reaction completion ratio in the step 2B tends to be suitable.

The reactions in the step 1A and the step 2B may be performed by heating the reaction products at normal pressure. Alternatively, the reactions in the step 1A and the step 2B may be performed by heating the reaction products at normal pressure and then further heating the reaction products under reduced pressure.

The reaction temperature in the step 1B and the step 2B is not particularly limited as long as it is under raised temperature conditions, being, for example, 80 to 290° C. (Including both end values. In the present specification, the same applies unless otherwise described.), preferably 120 to 270° C., and more preferably 150 to 250° C.

In the step 1A and the step 2B, when the reaction is performed under reduced pressure, the pressure in the system is, for example, 100 kPa or less, preferably 50 kPa or less, more preferably 30 kPa or less, and still more preferably 15 kPa or less, though not particularly limited under reduced pressure.

In the step 1B and the step 2A, the reaction may be performed by heating reaction products under normal pressure. Alternatively, in the step 1B and the step 2A, the reaction may be performed by heating the reaction products under normal pressure and then further heating under reduced pressure. Alternatively, in the step 1B and the step 2A, the reaction may be performed by gradually raising temperature and reducing pressure, and then by finally maintaining the raised temperature and reduced pressure.

In the step 1B and the step 2A, the reaction temperature (final temperature) is, for example, 100 to 290° C., preferably 130 to 280° C., and more preferably 160 to 260° C., though not particularly limited under raised temperature conditions.

In the step 1B and the step 2A, when the reaction is performed under reduced pressure, the pressure in the system is, for example, 10 kPa or less, preferably 5 kPa or less, and more preferably 1 kPa or less, though not particularly limited under reduced pressure conditions.

It is preferable that the steps 1A, 1B, 2A and 2B be performed in the presence of an inert gas. Examples of the inert gas include nitrogen gas and argon gas.

In each of the steps 1A, 1B, 2A and 2B, each of the reaction products may be supplied as follows. A solid reaction product may be supplied as solid, may be heated to a molten state to be supplied, or may be supplied as an aqueous solution. A liquid reaction product may be supplied as a single liquid, or may be supplied as a mixture with a solvent. The form of reaction may be any of batch-type, continuous-type, and a combination of batch-type and continuous-type.

It is preferable that the steps 1A, 1B, 2A and 2B be performed in the presence of a catalyst. Examples of the catalyst include a catalyst usually used for synthesis of a polycarbonate or synthesis of a polyester. Specific examples thereof include an alkali metal compound, an alkaline earth metal compound, a nitrogen-containing compound, and a salt of titanium, tin, zinc, zirconium and/or lead. It is also possible to use a basic compound such as a basic boron compound and a basic phosphorus compound supplementarily together with the alkali metal compound and/or the alkaline earth metal compound.

Examples of the alkali metal compound include an organic acid salt, an inorganic salt, an oxide, a hydroxide, a hydride and an alkoxide of an alkali metal. Specific examples thereof include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium phenyl borate, potassium phenyl borate, lithium phenyl borate, cesium phenyl borate, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, an alcoholate and phenolate of sodium, potassium, lithium or cesium, and a sodium salt, a dipotassium salt, a dilithium salt and a dicesium salt of bisphenol A.

Examples of the alkaline earth metal compound include an organic acid salt, inorganic salt, oxide, hydroxide, hydride and alkoxide of an alkaline earth metal compound. Specific examples thereof include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

Examples of the nitrogen-containing compound include a quaternary ammonium hydroxide and a salt thereof, and amines. Specific examples thereof include a quaternary ammonium hydroxide having an alkyl group and/or aryl group such as tetramethylammonium hydroxide, tetraethylammonium hydroxide, tetrapropylammonium hydroxide, tetrabutylammonium hydroxide, and trimethyl benzylammonium hydroxide; a tertiary amine such as triethyl amine, dimethyl benzyl amine, and triphenyl amine; a secondary amine such as diethyl amine and dibutyl amine; a primary amine such as propyl amine and butyl amine; imidazoles such as 2-methyl imidazole, 2-phenyl imidazole, and benzoimidazole; and a base or a basic salt such as ammonia, tetramethylammonium borohydride, tetrabutylammonium borohydride, tetrabutylammonium tetraphenylborate, and tetraphenylammonium tetraphenylborate.

Examples of the titanium salt include tetramethyl titanate, tetrabutyl titanate, tetrapropyl titanate, tetraisopropyl titanate, tetraisobutyl titanate, and tetraphenyl titanate.

Examples of the tin salt include tin (II) chloride, tin (IV) chloride, tin (II) acetate, tin (IV)acetate, dibutyltin oxide, dibutyltin dilaurate, dibutyltin dimethoxide, and dibutyltin diacetate.

Example of the zinc salt include zinc acetate, zinc benzoate, and zinc 2-ethyl hexanoate.

Examples of the zirconium salt include zirconium acetylacetonate, zirconium oxyacetate, and zirconium tetrabutoxide.

Examples of the lead salt include lead (II) acetate and lead (IV)acetate.

Examples of the basic boron compound for use in combination with an alkali metal compound and/or alkaline earth metal compound include a sodium salt, potassium salt, lithium salt, calcium salt, barium salt, magnesium salt and strontium salt of tetramethyl boron, tetraethyl boron, tetrapropyl boron, tetrabutyl boron, trimethyl ethyl boron, trimethyl benzyl boron, trimethyl phenyl boron, triethyl methyl boron, triethyl benzyl boron, triethyl phenyl boron, tributyl benzyl boron, tributyl phenyl boron, tetraphenyl boron, benzyl triphenyl boron, methyl triphenyl boron, and butyl triphenyl boron.

Examples of the basic phosphorus compound include triethylphosphine, tri-n-propylphosphine, tri-isopropylphosphine, tri-n-butylphosphine, triphenylphosphine, tributylphosphine, and a quaternary phosphonium salt.

Examples of the catalyst that is usually used for synthesis of a polycarbonate and polyester include an antimony compound such as diantimony trioxide; a germanium compound such as germanium dioxide and germanium tetroxide; a manganese compound and catalysts disclosed in U.S. Pat. No. 4,025,492, No. 4136089, No. 4176224, No. 4238593 and No. 4208527, and R. E. Wilfong, Journal of Polymer Science, 54, 385, (1961).

One type of catalysts may be used alone, or two or more types of catalysts may be used in combination. In the production method in the present embodiment, preferably a titanium salt catalyst is used.

In one aspect in which a catalyst is used, the catalyst has only to be added in the steps 1A and 2A, and new addition of the catalyst is not necessarily required in the steps 1B and 2B. Alternatively, in only a part of the respective steps of the production method in the present aspect, the reaction may be performed in the presence of a catalyst.

The amount of the catalyst used is, though not particularly limited, for example, 0.1 to 500 μmol, preferably 0.5 to 100 μmol, in terms of metal atom, relative to 1 mole of all the dihydroxy compounds for use in the reaction.

In at least one step of the steps 1A, 1B, 2A and 2B, the compounds described above other than the dicarboxylic acid compound represented by the formula (4), the dicarboxylic anhydride represented by the formula (4'), the dihydroxy compound represented by the formula (5) and the carbonate compound represented by the formula (6) may be added to a reaction system to react together with the dicarboxylic acid compound, the dicarboxylic anhydride, the dihydroxy compound and/or the carbonate compound.

The method for producing a curable resin in the present embodiment may have another step other than the steps 1A, 1B, 2A and 2B, in which the compounds described above other than the dicarboxylic acid compound represented by the formula (4), the dicarboxylic anhydride represented by the formula (4'), the dihydroxy compound represented by the formula (5) and the carbonate compound represented by the formula (6) are exclusively reacted.

The method for producing a curable resin in the present embodiment may include a step of purifying a resulting product after reacting the dicarboxylic acid compound and/or dicarboxylic anhydride, the dihydroxy compound and the carbonate compound as described above. The purification step may be a step of removing unreacted reaction products and/or by-products and/or catalyst components incorporated into the curable resin. Examples of the by-products include compounds produced by a condensation reaction of the dicarboxylic anhydride, the dihydroxy compound and the carbonate compound.

As the purification step, a general method for use in purifying resins may be appropriately used. Specific examples of the method include a reprecipitation method in which a resin is dissolved in a solvent and then dropped into a poor solvent or water and a liquid-liquid extraction method. As the purification step, preferably a liquid-liquid extraction with use of toluene and a sodium carbonate aqueous solution may be used. In such a method, toluene that has a low dielectric constant is used as oil phase, so that a curable resin having more excellent dielectric properties tends to be obtained after purification. Such a purification step may be performed in the middle of respective steps (for example, between the steps 1A and 2A, and between the steps 1B and 2B).

Regarding the method for producing the present embodiment, "Polyester Resin Handbook" (by Eiichiro Takiyama, published by THE NIKKAN KOGYO SHIMBUN, LTD.) may be appropriately referenced to.

In addition to the production method described above, the curable resin of the present embodiment may be produced by a method of reacting a polycarbonate diol with at least one of a dicarboxylic acid compound and a dicarboxylic acid anhydride. The polycarbonate diol for use is not particularly limited as long as it is a compound that includes a carbonate bond and has a hydroxy group at both ends, and examples thereof include a conventionally known and commercially available polycarbonate diol. The reaction conditions and usable catalysts may be the same as ones for the step 2B described above.

Alternatively, in the production method including the steps 1A and 1B, and in the production method including the steps 2A and 2B, a polycarbonate diol may be used instead of the dihydroxy compound represented by the formula (5). The polycarbonate diol for use is not particularly limited as long as it is a compound that contains a carbonate bond and has a hydroxy group at both ends, and examples thereof include a conventionally known and commercially available polycarbonate diol. In such an aspect, a curable resin that contains many carbonate units tends to be obtained.

The method for producing a curable resin in the present embodiment includes an aspect of the method for producing a curable resin obtained by an optional combination of all the aspects described above.

[Resin Composition]

One embodiment of the present invention relates to a resin composition that contains the curable resin in the present embodiment. The resin composition of the present embodiment may further contain another component in addition to the curable resin in the present embodiment.

Examples of the other components that may be contained in the resin composition of the present embodiment include an epoxy resin, a cyanate compound, a maleimide compound, a BT resin, a compound having a polymerizable unsaturated group, a compound having an ester structure derived from a phenol group and an aromatic carboxylic group, a modified silicone oil, a heat stabilizer, an antioxidant, a curing agent and curing accelerator. The components may be used alone or may be used in combination of two or more.

Examples of the epoxy resin include a phenol phenyl aralkyl novolac-type epoxy resin, a phenol biphenyl aralkyl-type epoxy resin, a naphthol aralkyl-type epoxy resin, an anthraquinone-type epoxy resin, a polyoxynaphthylene-type epoxy resin, a bisphenol A-type epoxy resin, a bisphenol F-type epoxy resin, a phenol novolac-type epoxy resin, a cresol novolac-type epoxy resin, a bisphenol A novolac-type epoxy resin, a trifunctional phenol-type epoxy resin, a tetrafunctional phenol-type epoxy resin, a naphthalene-type epoxy resin, a biphenyl-type epoxy resin, an aralkyl novolac-type epoxy resin, an alicyclic epoxy resin, a polyol-type epoxy resin, a compound having an epoxidized double bond of glycidyl amine, glycidyl ester or butadiene, a compound obtained from a reaction between hydroxy group-containing silicone resins and epichlorohydrin, and a halide thereof. These may be used alone or may be used in combination of two or more.

Examples of the cyanate compound include a naphthol aralkyl-type cyanate compound, a novolac-type cyanate, a phenol biphenyl aralkyl-type cyanate compound, bis(3,5-dimethyl-4-cyanatephenyl) methane, bis(4-cyanatephenyl) methane, 1,3-dicyanatebenzene, 1,4-dicyanatebenzene, 1,3,5-tricyanatebenzene, 1,3-dicyanatenaphthalene, 1,4-dicyanatenaphthalene, 1,6-dicyanatenaphthalene, 1,8-dicyanatenaphthalene, 2,6-dicyanatenaphthalene, 2,7-dicyanatenaphthalene, 1,3,6-tricyanatenaphthalene, 4,4'-dicyanatebiphenyl, bis(4-cyanatephenyl) ether, bis(4-cyanatephenyl)thioether, bis(4-cyanatephenyl) sulfone, 2,2-bis(4-cyanatephenyl) propane, polymethylene polyphenyl polyisocyanate, m-tetramethylxylene diisocyanate, hydrogenated xylene diisocyanate (1,3-bis(isocyanatemethyl)cyclohexane), isophorone diisocyanate, norbornene diisocyanate, dicyclohexylmethane diisocyanate, hydrogenated methylene bisphenylene diisocyanate, 1,4-cyclohexane diisocyanate, 1,6-hexamethylene diisocyanate, trimethylene diisocyanate, and a trifunctional isocyanate having an isocyanurate ring with a trimerized difunctional isocyanate compound. These may be used singly, or may be used in combinations of two or more thereof.

Examples of the maleimide compound include N-phenyl maleimide, N-hydroxyphenyl maleimide, bis(4-maleimidephenyl) methane, 2,2-bis {4-(4-maleimidephenoxy)-phenyl}propane, bis(3,5-dimethyl-4-maleimidephenyl) methane, bis(3-ethyl-5-methyl-4-maleimidephenyl) methane, bis(3,5-diethyl-4-maleimidephenyl) methane, a prepolymer of these maleimide compounds, and a prepolymer of a maleimide compound and an amine compound. These may be used singly, or may be used in combinations of two or more thereof.

The BT resin is a prepolymer made by heating and mixing a cyanate compound and a maleimide compound without solvent or after dissolving the same in an organic solvent such as methyl ethyl ketone, N-methylpyrrolidone, dimethyl formaldehyde, dimethyl acetoamide, toluene and xylene. As the cyanate compound and the maleimide compound, those described above may be used. These may be used singly, or may be used in combinations of two or more thereof.

The compound having a polymerizable unsaturated group is not particularly limited, and examples thereof include a vinyl compound such as ethylene, styrene, divinylbenzene and divinyl biphenyl; (meth)acrylates of monohydric or polyhydric alcohol such as methyl (meth)acrylate, 2-hydroxyethyl (meth)acrylate, 2-hydroxypropyl (meth)acrylate, tricyclodecanol (meth)acrylate, tricyclodecanol di(meth)acrylate, tricyclodecanol tri(meth)acrylate, polypropylene glycol di(meth)acrylate, trimethylolpropane di(meth)acrylate, trimethylolpropane tri(meth)acrylate, pentaerythritol tetra(meth)acrylate, and dipentaerythritol hexa(meth)acrylate; epoxy(meth)acrylates such as bisphenol A-type epoxy (meth)acrylate and bisphenol F-type epoxy(meth)acrylate; an allyl compound such as allylchloride, allyl acetate, allyl ether, propylene, triallyl cyanurate, triallyl isocyanurate, diallyl phthalate, diallyl isophthalate, and diallyl maleate; a benzo cyclobutene resin; and a (bis) maleimide resin. These compounds having a polymerizable unsaturated group may be used alone or as a mixture of two or more.

Examples of the compound having an ester structure derived from a phenol group and an aromatic carboxylic group include an active ester resin (I) of which reaction starting material is a compound selected from a compound (a1) having one phenolic hydroxy group, a compound (a2) having two or more phenolic hydroxy groups, and an aromatic polycarboxylic acid or acid halide thereof (a3), and an active ester resin (II) of which reaction starting material is a compound selected from a compound (b1) having two or more phenolic hydroxy groups, an aromatic monocarboxylic acid or acid halide thereof (b2), and an aromatic polycarboxylic acid or an acid halide thereof (b3). Specific examples of these compounds may be referred to International Publication No. WO 2020/003824. These may be used singly, or may be used in combinations of two or more thereof.

Examples of the modified silicone oil include ones having a chain siloxane backbone, with a group other than hydrogen or a hydrocarbon group in the molecular structure. Examples of the modified group include an epoxy group, an amino group, a hydroxy group, a methacrylic group, a mercapto group, a carboxy group, an alkoxy group and a silanol group. These may be used singly, or may be used in combinations of two or more thereof.

Examples of the heat stabilizer include phosphorus acid, phosphoric acid, phosphonous acid, phosphonic acid, and an ester thereof. Specific examples thereof include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylene bis(4,6-di-tert-butylphenyl) octyl phosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, 4,4'-biphenylene diphosphinic acid tetrakis(2,4-di-tert-butylphenyl), dimethyl benzene phosphonate, diethyl benzene phosphonate, and dipropyl benzene phosphonate. These may be used singly, or may be used in combinations of two or more thereof.

Examples of the antioxidant include pentaerythritol tetrakis(3-mercaptopropionate), pentaerythritol tetrakis(3-laurylpropionate), glycerol-3-stearyl thiopropionate, triethylene glycerol-bis [3-(3-tert-butyl-5-methyl-4-hydroxyphenyl) propionate], 1,6-hexanediol-bis [3-(3,5-di-tert-butyl-4-hydroxyphenyl) propionate], pentaerythritol-tetrakis [3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexamethylene bis(3,5-di-tert-butyl-4-hydroxy-hydrocinnamide), 3,5-di-tert-butyl-4-hydroxy-benzylphosphate-diethyl ester, tris(3,5-di-tert-butyl-4-hydroxybenzyl) isocyanurate, 4,4'-biphenylene diphosphonic acid tetrakis(2,4-di-tert-butylphenyl), and 3,9-bis {1,1-dimethyl-2-[β-(3-tert-butyl-4-hydroxy-5-methylphenyl) propionyloxy] ethyl}-2,4,8,10-tetraoxaspiro(5,5) undecane. These may be used singly, or may be used in combinations of two or more thereof.

Examples of the curing agent include a polyfunctional phenolic compound such as phenol novolac, cresol novolac and aminotriazine novolac resins; an amine compound such as dicyandiamide, diaminodiphenylmethane and diaminodiphenylsulfone; and an acid anhydride such as phthalic anhydride, pyromelltic anhydride and maleic anhydride.

Examples of the curing accelerator include an organic metal salt and organic metal complex such as zinc naphthenate, cobalt naphthenate, tin octylate, cobalt octylate, bisacetylacetonate cobalt (II), trisacetylacetonate cobalt (III), zinc (II) acetylacetonate and iron (III) acetylacetonate, imidazoles and derivatives thereof, organic phosphorus compounds, secondary amines, tertiary amines and quaternary ammonium salts.

These may be used singly, or may be used in combinations of two or more thereof.

It is preferable that the resin composition of the present embodiment contain a component that reacts with the curable resin of the present embodiment to be cured together, among the components described above. Examples of such a component include (meth)acrylate, isocyanurate, a maleimide compound, a compound having a vinyl group, and a compound having an allyl group.

The resin composition of may further contain an initiator for initiating curing. Examples of the initiator include an organic peroxide-based initiator that initiates curing by heating, and a UV initiator that initiates curing by exposure to light.

Examples of the organic peroxide-based initiator include a ketone peroxide such as methyl ethyl ketone peroxide and acetyl acetone peroxide; a diacyl peroxide such as benzoyl peroxide; a peroxy ester such as t-butylperoxybenzoate; a hydroperoxide such as cumene hydroperoxide; and a dialkyl peroxide such as dicumyl peroxide.

Examples of the UV initiator include a benzophenone such as benzophenone, benzyl and methyl orthobenzoyl benzoate; a benzoin ether such as benzoin alkyl ether; an acetophenone such as benzyl dimethyl ketal, 2,2-diethoxy acetophenone, 2-hydroxy-2-methylpropyl phenone, 4-isopropyl-2-hydroxy-2-methylpropiophenone, and 1,1-dichloroaceto phenone; and thioxanthone such as 2-chlorothioxanthone, 2-methylthioxanthone, and 2-isopropylthioxanthone.

The resin composition may further contain a crosslinking agent other than the above. Alternatively, the curable resin of the present embodiment may be cured alone without use of a crosslinking agent, due to having an ethylenic double bond and/or an acetylenic triple bond. Accordingly, the resin composition of the present embodiment may contain no crosslinking agent.

The content of the curable resin of the present embodiment in the resin composition may be, for example, 1.0 part by mass relative to 100 parts by mass of resin component (resin and component to be cured together with the resin, i.e. a synonym for solid component).

For example, in the case where the curable resin of the present embodiment as compatibilizer is added to a resin composition, the content of the curable resin of the present embodiment may be, for example, 1.0 part by mass or more and 10 parts by mass or less, or 3.0 parts by mass or more and 5.0 parts by mass or less, relative to 100 parts by mass of the resin component.

Alternatively, the content of the curable resin of the present embodiment in the resin composition may be, for example, 10 parts by mass or more, 20 parts by mass or more, 30 parts by mass or more, 50 parts by mass or more, 70 parts by mass or more, 80 parts by mass or more, 90 parts by mass or more, or 95 parts by mass or more, relative to 100 parts by mass of the resin component. With a content of the curable resin of the present embodiment in the range, a resin composition furthermore excellent in dielectric properties tends to be obtained. Also, a cured product of the resin composition tends to have good color tone with a low degree of yellowness.

The upper limit of the content of the curable resin of the present embodiment in the resin composition is not particularly limited, and may be 100 parts by mass, 99 parts by mass, 95 parts by mass, 90 parts by mass, or 80 parts by mass, relative to 100 parts by mass of the resin component.

Incidentally, the content of the components other than the curable resin of the present embodiment in the resin composition may be appropriately adjusted in the range where the content of the curable resin of the present embodiment is in the range described above.

The resin composition may further contain a filler such as reinforcing base material and inorganic filler.

The inorganic filler is not particularly limited as long as it is usually used in the industry. Specific examples include silicas such as natural silica, fused silica, amorphous silica and hollow silica; metal hydroxides such as aluminum hydroxide, heat-treated products of aluminum hydroxide (ones produced by heat-treating aluminum hydroxide and then decreasing a part of crystalline water), magnesium hydroxide and boehmite; nitrides such as aluminum nitride and boron nitride; molybdenum compounds such as molybdenum oxide and zinc molybdate; zinc borate, zinc stannate, alumina, clay, kaolin, talc, fired clay, fired kaolin, fired talc, mica, short glass fiber (fine glass particles such as E-glass or D-glass), hollow glass, spherical glass, titanium oxide, silicone rubber, and silicone composite powder.

Examples of the reinforcing base material include paper, glass cloth, nonwoven glass cloth, aramid paper, glass mat and glass roving cloth.

The fillers may be used singly, or may be used in combinations of two or more thereof.

The content of filler in the resin composition is, for example, 1 to 2000 parts by mass relative to 100 parts by mass of the resin component, though not particularly limited. The content of filler may be appropriately changed depending on the use of the resin composition.

The resin composition may contain a silane coupling agent and a wetting and dispersing agent in addition to a filler. These components contained therein improves dispersibility of the filler, particularly the inorganic filler, and tends to improve the adhesive strength between the resin and the filler.

The silane coupling agent is not particularly limited, as long as it is a silane coupling agent for general use in surface treatment of inorganic products. Specific examples include an aminosilane-based silane coupling agent such as γ-aminopropyl triethoxysilane and N-β-(aminoethyl)-γ-aminopropyl trimethoxysilane; an epoxysilane-based silane coupling agent such as γ-glycidoxypropyl trimethoxysilane; a vinylsilane-based silane coupling agent such as γ-methacryloxy propyltrimethoxysilane; a cationic silane-based silane coupling agent such as N-β-(N-vinylbenzylaminoethyl)-γ-aminopropyl trimethoxysilane hydrochloride; a phenyl silane-based silane coupling agent; and a styryl silane-based coupling agent such as p-styryl trimethoxysilane, p-styryl triethoxysilane, p-styryl methyldimethoxysilane, p-styryl methyldiethoxysilane, and N-(vinylbenzyl)-2-aminoethyl-3-aminopropyl trimethoxysilane hydrochloride.

The wetting and dispersing agent is not particularly limited, as long as it is a dispersion stabilizer for use in paints. Specific examples thereof include a wetting and dispersing agent such as Disperbyk-110, 111, 180, 161, BYK-W996, W9010 and W903 manufactured by BYK Japan KK.

These silane coupling agents and wetting and dispersing agents may be used alone or may be used in a combination of two or more.

The resin composition of the present embodiment may further contain a solvent on an as needed basis. By containing an organic solvent, the resin composition has a lowered viscosity during preparation, so that handling properties tend to be improved. The solvent is not particularly limited, as long as it can dissolve at least one component in the resin composition. Specific examples thereof include ketones such as acetone, methyl ethyl ketone, and methyl cellosolve; aromatic hydrocarbons such as toluene and xylene; amides such as dimethyl formamide; propylene glycol methyl ether and other acetates. The solvents may be used singly, or may be used in combinations of two or more thereof.

An embodiment of the present invention relates to a cured product of the curable resin in the present embodiment, and a cured product of the resin composition in the present embodiment. Since the cured product in the present embodiment is a cured product including the curable resin in the present embodiment, it has excellent dielectric properties. Also, the cured product in the present embodiment tends to have a good color tone.

The method for curing the curable resin or the resin composition of the present embodiment is not particularly limited, and may be appropriately selected depending on the type of resin. Examples of the curing method include thermal curing and photocuring.

When the resin composition is cured, it is preferable that the resin composition be once dissolved in a solvent and mixed to achieve uniform mixing of the individual components and then dried to be cured.

[Use]

Examples of the use of the curable resin, resin composition and cured product thereof in the present embodiment include use for electronic materials. Specific examples thereof include an electronic component, a semiconductor sealing material, a mold resin, a rigid substrate, a prepreg, a laminate, a resin-attached copper foil, a circuit board, an underfill material, and a buildup film. In addition, the resin composition or cured product together with an additive such as an unsaturated polyester and an epoxy resin or the resin composition or cured product alone may be used as a fiber-reinforced composite material such as carbon fiber reinforced plastic and glass fiber reinforced plastic.

A fiber-reinforced composite material including the resin composition of the present embodiment and a reinforcement fiber may be cured to produce a fiber-reinforced formed article. The reinforcement fiber is not particularly limited, and examples thereof include a glass fiber, a carbon fiber, a boron fiber and an aramid fiber.

A semiconductor sealing material including the resin composition of the present embodiment and an inorganic filler is used for producing a semiconductor device. As the inorganic filler, ones described above may be used.

A prepreg includes a base material and the resin composition impregnated into or applied to the base material. The method for producing a prepreg is not particularly limited, and may be performed according to the usual procedure. For example, the resin composition is impregnated into or applied to a base material and then heated in a dryer at 100 to 200° C. for 1 to 30 minutes, so that semi-curing (making β-stage resin) is achieved to make a prepreg.

The base material is not particularly limited, and a known one used in various printed wiring board materials may be appropriately selected depending on the application and performance for use. Specific examples of the fiber to constitute a base material is not particularly limited, and include, for example, glass fiber such as E-glass, D-glass, S-glass, Q-glass, spherical glass, NE-glass, L-glass and T-glass; inorganic fiber of other than glass such as quartz; a wholly aromatic polyamide such as polyparaphenylene terephthalamide (Kevlar (registered trademark), manufactured by DuPont de Nemours, Inc.) and copolyprarphenylene-3,4'-oxydiphenylene-terephthalamide (Technora (registered trademark), manufactured by TEIJIN LIMITED); a polyester such as 2,6-hydroxy naphthoic acid-parahydroxybenzoic acid (Vectran (registered trademark), manufactured by Kuraray Co., Ltd.) and Zxion (registered trademark, manufactured by KB SEIREN LTD.); and organic fiber such as polyparaphenylene benzoxazole (Zylon (registered trademark), manufactured by TOYOBO MC Corporation) and polyimide. These base materials may be used alone or may be used in a combination of two or more.

The laminate is a laminated body including at least a prepreg. The laminate is obtained, for example, by laminating a prepreg in combination with another layer. Examples of the other layer is not particularly limited, and examples thereof include a separately prepared wiring board for an inner layer.

The circuit board includes a laminate and a metal foil disposed on one or both surfaces of the laminate. The circuit board is, for example, a copper foil-clad laminate obtained by laminating the prepreg and a copper foil and curing the laminate. The copper foil for use is not particularly limited as long as it is used for a circuit board, and a publicly known copper foil such as a rolled copper foil and an electrolytic copper foil is preferred.

The buildup film includes a cured product of the resin composition and a base material film. The term "buildup" means preparing a printed wiring board having a multilayer structure by laminating prepregs or resin sheets and repeating drilling and wiring layer by layer.

As further effects of the present embodiment, for example, low thermal expansion, crack prevention, good color tone, solubility in solvent and suppression of separation between resins during curing are expected.

EXAMPLES

The present invention will be described more detail with reference to Examples and Comparative Examples, though the technical scope of the present invention is not limited thereto.

[Measurement of Number Average Molecular Weight of Curable Resin]

The curable resin was dissolved in tetrahydrofuran to have a resin content of 0.2 mass %, and subjected to measurement by gel permeation chromatography (GPC). The number average molecular weight of each of the curable resins was calculated according to a calibration curve prepared by using a standard polystyrene. In the GPC, a column TSKgel Super HM-M manufactured by Tosoh Corporation was used, and measurement was performed at a column temperature of 40° C. Tetrahydrofuran as eluent was circulated at a flow rate of 0.6 ml/min, and measurement was performed by a refractive index detector.

[Production of Curable Resin]

Example 1

In a 500-ml separable flask, 175 g of D-NDM (about 1:1 mixture of decahydro-1, 4:5,8-dimethnonaphthalene-2,6 (7)-dimethanol represented by the following formulas (8) and (9)), 7.7 g of maleic anhydride, and 0.015 g of tetra-n-butyl titanate were placed. The mixture was subjected to gradual temperatures rise to 200° C. under nitrogen flow while stirring, and held until no appearance of distilled water. Then, the pressure was gradually decreased to 13 kPa, and then held for 30 minutes. The temperature was then cooled to normal temperature. Then, 163 g of diphenyl carbonate was added thereto, and temperature rising and pressure reduction were gradually performed. The polymerization was finally performed at 230° C. and under 0.1 kPa or less. Thereby, a curable resin A was obtained. The curable resin A had a number average molecular weight of 5000.

(8)

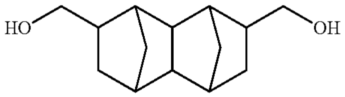

-continued (9)

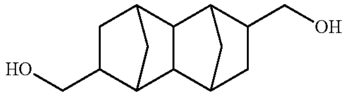

Example 2

A curable resin B was obtained by the same method as in Example 1, except that the amount of diphenyl carbonate used was 160 g. The curable resin B had a number average molecular weight of 5000.

Example 3

A curable resin C was obtained by the same method as in Example 1, except that 219 g or D-NDM, 19 g or maleic anhydride, 0.018 g of tetra-n-butyl titanate, and 181 g of diphenyl carbonate were used. The curable resin C had a number average molecular weight of 5000.

Example 4

In a 500-ml separable flask, 216 g of TCDDM (tricyclodecane dimethanol represented by the following formula (10)), 9.8 g of maleic anhydride, and 0.020 g of tetra-n-butyl titanate were placed. The mixture was subjected to gradual temperatures rise to 165° C. under nitrogen flow while stirring, and held until no appearance of distilled water. Then, the pressure was gradually reduced to 13 kPa, then held for 30 minutes, and the mixture was cooled to normal temperature. Then, 226 g of diphenyl carbonate was added to the mixture, and temperature rise and pressure reduction were gradually performed. The polymerization was performed finally at 230° C. and at 0.1 kPa or less. Thereby, a curable resin D was obtained. The curable resin D had a number average molecular weight of 4800.

(10)

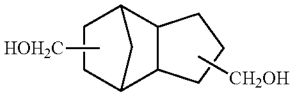

Example 5

In a 500-ml separable flask, 175 g of D-NDM, 152 g of diphenyl carbonate, and 0.015 g of tetra-n-butyl titanate were placed. The mixture was subjected to gradual temperatures rise and pressure reduction under nitrogen flow while stirring, and polymerization was performed finally at 230° C. and at 0.1 kPa or less. After the mixture was cooled to normal temperature, 7.7 g of maleic anhydride was added thereto and the temperature was raised to 200° C. to be held until no appearance of distilled water. Then, the pressure was gradually reduced to 13 kPa, then held for 30 minutes for polymerization to obtain a curable resin E. The curable resin E had a number average molecular weight of 5000.

Example 6

In a 500-ml separable flask, 137 g of 1,4-cyclohexane dimethanol, 183 g of diphenyl carbonate, and 0.0097 g of tetra-n-butyl titanate were placed. The mixture was subjected to gradual temperatures rise and pressure reduction under nitrogen flow while stirring, and polymerization was performed finally at 230° C. and at 0.1 kPa or less. After the mixture was cooled to normal temperature, 9.3 g of maleic anhydride was added thereto and the temperature was raised to 200° C. to be held until no appearance of distilled water. Then, the pressure was gradually reduced to 13 kPa, then held for 30 minutes for polymerization to obtain a curable resin H. The curable resin E had a number average molecular weight of 5000.

Comparative Example 1

In a 500-ml separable flask, 151 g of propylene glycol, 93 g of maleic anhydride, and 140 g of phthalic anhydride were placed. The mixture was subjected to gradual temperatures rise to 200° C. under nitrogen flow while stirring, and held until no appearance of distilled water. Then, the pressure was gradually reduced to 13 kPa, then held for 30 minutes to obtain a curable resin F, i.e. unsaturated polyester resin.

Comparative Example 2

In a 500-ml separable flask, 222 g of D-NHEs (decahydro-1, 4:5,8-dimthanonaphthalene-2-methoxycarbonyl-6 (7)-methanol), 9.0 g of maleic anhydride, and 0.020 g of tetra-n-butyl titanate were placed. The mixture was subjected to gradual temperatures rise and pressure reduction under nitrogen flow while stirring, and polymerization was performed finally at 280° C. and at 0.1 kPa or less to obtain a curable resin G.

[Evaluation of Curable Resin]

(Measurement Method of Dielectric Constant and Dielectric Loss Tangent)

In the following Examples 7 to 17 and Comparative Examples 3 to 5, samples in a rod shape of the cured product of the resin composition were prepared. The samples were subjected to measurement of the dielectric constant and the dielectric loss tangent at 10 GHz by cavity resonator perturbation (Agilent 8722ES, manufactured by Agilent Technologies, Inc.).

Example 7

In toluene, 5.6 g of the curable resin A produced as described above, 1.9 g of tricyclodecanol acrylate, and 0.075 g of Perbutyl P (manufactured by NOF CORPORATION) were dissolved to obtain a 20 wt % solution. The solution was then put in a vacuum dryer and dried at normal temperature for 48 hours, and at 60° C. for 3 hours to remove toluene. After removal of toluene, the resin composition was placed in a mold, and sandwiched between an Aflex film (manufactured by AGC Inc.) and an SUS plate, and put in a vacuum press heated at 200° C. After reducing the pressure to $10^{-2}$ kPa, pressing pressure was gradually increased to 0.6 MPa. After heating for 90 minutes, the pressed product was taken out and gradually cooled. After gradual cooling, the cured product of the resin composition was taken out from the mold. The cured product taken out from the mold was cut into a width of 0.8 mm to make samples in a rod shape. The cut samples were dried in a vacuum dryer at 70° C. for one day, and then subjected to measurement of the dielectric constant and the dielectric loss tangent. The results are shown in Table 1.

Examples 8 to 17 and Comparative Examples 3 to 5

Samples in a rod shape were prepared in the same manner as in Example 7, except that the resin compositions were compounded in amounts described in Table 1 or Table 2. The results of measurement of the dielectric constant and the dielectric loss tangent are shown in Tables 1 and 2.

TABLE 1

| | | Example 7 | Example 8 | Example 9 | Example 10 | Example 11 | Example 12 | Example 13 |
|---|---|---|---|---|---|---|---|---|
| Amount | Curable resin A | 5.6 | 0.0 | 0.0 | 5.6 | 5.6 | 3.8 | 1.9 |
| compounded | Curable resin B | 0.0 | 5.6 | 0.0 | 0.0 | 0.0 | 0.0 | 0.0 |
| (g) | Curable resin C | 0.0 | 0.0 | 5.6 | 0.0 | 0.0 | 0.0 | 0.0 |
| | Curable resin D | 0.0 | 0.0 | 0.0 | 0.0 | 0.0 | 0.0 | 0.0 |
| | Curable resin E | 0.0 | 0.0 | 0.0 | 0.0 | 0.0 | 0.0 | 0.0 |
| | Curable resin F | 0.0 | 0.0 | 0.0 | 0.0 | 0.0 | 0.0 | 0.0 |
| | Curable resin G | 0.0 | 0.0 | 0.0 | 0.0 | 0.0 | 0.0 | 0.0 |
| | Tricyclo decanol acrylate | 1.9 | 1.9 | 1.9 | 1.9 | 1.9 | 3.8 | 5.6 |
| | Triallyl isocyanurate | 0.0 | 0.0 | 0.0 | 0.0 | 0.0 | 0.0 | 0.0 |
| | Perbutyl P | 0.075 | 0.075 | 0.075 | 0.038 | 0.112 | 0.075 | 0.075 |
| Dielectric constant (Dk) | | 2.4 | 2.4 | 2.4 | 2.4 | 2.5 | 2.5 | 2.5 |
| Dielectric loss tangent (Df) | | 0.006 | 0.006 | 0.006 | 0.005 | 0.007 | 0.007 | 0.008 |

TABLE 2

| | | Example 14 | Example 15 | Example 16 | Example 17 | Comparative Example 3 | Comparative Example 4 | Comparative Example 5 |
|---|---|---|---|---|---|---|---|---|
| Amount | Curable resin A | 4.0 | 0.0 | 0.0 | 0.0 | 0.0 | 0.0 | 0.0 |
| compounded | Curable resin B | 0.0 | 0.0 | 0.0 | 0.0 | 0.0 | 0.0 | 0.0 |
| (g) | Curable resin C | 0.0 | 0.0 | 0.0 | 0.0 | 0.0 | 0.0 | 0.0 |
| | Curable resin D | 0.0 | 5.6 | 0.0 | 0.0 | 0.0 | 0.0 | 0.0 |
| | Curable resin E | 0.0 | 0.0 | 5.6 | 0.0 | 0.0 | 0.0 | 0.0 |
| | Curable resin F | 0.0 | 0.0 | 0.0 | 0.0 | 5.6 | 7.5 | 0.0 |
| | Curable resin G | 0.0 | 0.0 | 0.0 | 0.0 | 0.0 | 0.0 | 5.6 |

TABLE 2-continued

| | Example 14 | Example 15 | Example 16 | Example 17 | Comparative Example 3 | Comparative Example 4 | Comparative Example 5 |
|---|---|---|---|---|---|---|---|
| Curable resin H | 0.0 | 0.0 | 0.0 | 5.6 | 0.0 | 0.0 | 0.0 |
| Tricyclo decanol acrylate | 0.0 | 1.9 | 1.9 | 1.9 | 1.9 | 0.0 | 1.9 |
| Triallyl isocyanurate | 3.5 | 0.0 | 0.0 | 0.0 | 0.0 | 0.0 | 0.0 |
| Perbutyl P | 0.075 | 0.075 | 0.075 | 0.075 | 0.075 | 0.075 | 0.075 |
| Dielectric constant (Dk) | 2.5 | 2.5 | 2.4 | 2.4 | 2.8 | 2.8 | 2.5 |
| Dielectric loss tangent (Df) | 0.004 | 0.004 | 0.008 | 0.007 | 0.011 | 0.011 | 0.015 |

Example 18

From the results in Examples 7 and 10 to 13, the dielectric constant and the dielectric loss tangent of the curable resin A alone were calculated. Specifically, a proportional expression between the content of each component and the dielectric constant and dielectric loss tangent was calculated to obtain the dielectric constant and dielectric loss tangent of the curable resin A alone. The dielectric constant and dielectric loss tangent of the curable resin A alone were calculated to be 2.4 and 0.003, respectively.

[Further Production and Evaluation of Curable Resin]

Further, in the following Examples 19, 20 and 21, curable resins I, J and K were produced, respectively. Also, in Examples 22, 23 and 24, samples in a rod shape of the cured products of resin composition including the curable resins I, J and K, respectively, were prepared. The samples were subjected to measurement of the dielectric constant and the dielectric loss tangent at 10 GHz by cavity resonator perturbation (Agilent 8722ES, manufactured by Agilent Technologies, Inc.).

Example 19

In a 500-ml separable flask, 44.7 g of PCDDM (pentacyclo $[6.5.1.1^{3,6}.0^{2,7}.0^{9,13}]$ pentadecane dimethanol) represented by the following formula (12)), 1.7 g of maleic anhydride, and 0.0030 g of tetra-n-butyl titanate were placed. The mixture was subjected to gradual temperatures rise to 200° C. under nitrogen flow while stirring, and held until no appearance of distilled water. Then, the pressure was gradually reduced to 13 kPa, then held for 30 minutes, and the mixture was cooled to normal temperature. Then, 35.1 g of diphenyl carbonate was added to the mixture, and temperature rise and pressure reduction were gradually performed. The polymerization was performed finally at 230° C. and at 0.1 kPa or less. Thereby, a curable resin I was obtained. The curable resin I had a number average molecular weight of 4300.

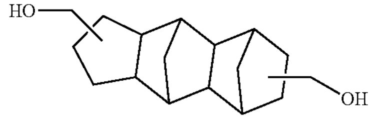

(12)

Example 20

In a 500-ml separable flask, 44.2 g of hydrogenated BisA (hydrogenated bisphenol A represented by the following formula (13)), 1.8 g of maleic anhydride, and 0.0030 g of tetra-n-butyl titanate were placed. The mixture was subjected to gradual temperatures rise to 200° C. under nitrogen flow while stirring, and held until no appearance of distilled water. Then, the pressure was gradually reduced to 13 kPa, then held for 30 minutes, and the mixture was cooled to normal temperature. Then, 38 g of diphenyl carbonate was added to the mixture, and temperature rise and pressure reduction were gradually performed. The polymerization was performed finally at 230° C. and at 0.1 kPa or less. Thereby, a curable resin J was obtained. The curable resin J had a number average molecular weight of 2000.

(13)

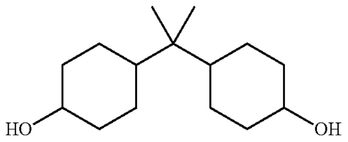

Example 21

In a 500-ml separable flask, 44.2 g of TMC (4,4'-(3,3,5-trimethyl cyclohexylidene)bisphenol represented by the following formula (14)), 1.8 g of maleic anhydride, and 0.0030 g of tetra-n-butyl titanate were placed. The mixture was subjected to gradual temperatures rise to 200° C. under nitrogen flow while stirring, and held until no appearance of distilled water. Then, the pressure was gradually reduced to 13 kPa, then held for 30 minutes, and the mixture was cooled to normal temperature. Then, 38 g of diphenyl carbonate was added to the mixture, and temperature rise and pressure reduction were gradually performed. The polymerization was performed finally at 230° C. and at 0.1 kPa or less. Thereby, a curable resin K was obtained. The curable resin K had a number average molecular weight of 2000.

(14)

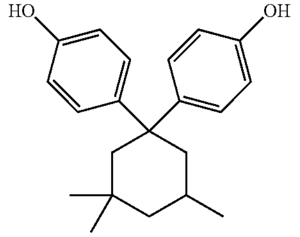

Examples 22 to 24

Samples in a rod shape were prepared in the same manner as in Example 7, except that the resin compositions were compounded in amounts described in Table 3. The results of measurement of the dielectric constant and the dielectric loss tangent are shown in Table 3.

TABLE 3

| | | Example 22 | Example 23 | Example 24 |
|---|---|---|---|---|
| Amount compounded (g) | Curable resin I | 5.6 | 0.0 | 0.0 |
| | Curable resin J | 0.0 | 5.6 | 0.0 |
| | Curable resin K | 0.0 | 0.0 | 5.6 |
| | Tricyclo decanol acrylate | 1.9 | 1.9 | 1.9 |
| | Perbutyl P | 0.075 | 0.075 | 0.075 |
| Dielectric constant (Dk) | | 2.5 | 2.5 | 2.4 |
| Dielectric loss tangent (Df) | | 0.005 | 0.006 | 0.007 |

The invention claimed is:

1. A curable resin comprising a structural unit represented by the following formula (1), a structural unit represented by the following formula (2), and a structural unit represented by the following formula (3):

(1)

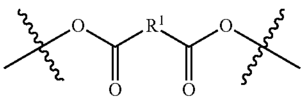

(2)

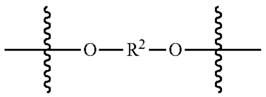

(3)

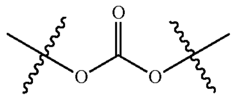

wherein $R^1$ in the formula (1) is a divalent group having one or more of at least one of an ethylenic double bond and an acetylenic triple bond, and $R^2$ in the formula (2) is a divalent group having an alicyclic structure, wherein a molar ratio of the structural unit represented by the formula (1) to the structural unit represented by the formula (2) is 0.010 or more and 0.50 or less; and a molar ratio of the structural unit represented by the formula (3) to the structural unit represented by the formula (2) is 0.50 or more and 1.5 or less.

2. The curable resin according to claim 1, wherein a molar ratio of the total of contents of the structural unit represented by the formula (1), the structural unit represented by the formula (2) and the structural unit represented by the formula (3) to all the structural units constituting the curable resin is 0.60 or more and 1.0 or less.

3. The curable resin according to claim 1, wherein the structural unit represented by the formula (3) is derived from at least one selected from the group consisting of a dialkyl carbonate, a diaryl carbonate, and an alkyl aryl carbonate.

4. The curable resin according to claim 1, wherein the structural unit represented by the formula (1) is derived from at least one selected from the group consisting of fumaric acid, maleic acid, and maleic anhydride.

5. The curable resin according to claim 1, wherein the structural unit represented by the formula (2) is derived from a dihydroxy compound containing at least one selected from the group consisting of a norbornane-based backbone and a cyclohexane-based backbone.

6. The curable resin according to claim 1, wherein the molar ratio of the structural unit represented by the formula (1) to the structural unit represented by the formula (2) is 0.010 or more and less than 0.30.

7. The curable resin according to claim 1, wherein the molar ratio of the structural unit represented by the formula (3) to the structural unit represented by the formula (2) is 0.80or more and 1.5 or less.

8. The curable resin according to claim 1, having a number average molecular weight of $5.00\times10^2$ or more and $3.00\times10^4$ or less.

9. The curable resin according to claim 1, comprising a polyester portion that contains the structural unit represented by the formula (1) and the structural unit represented by the formula (2) and that contains no structural unit represented by the formula (3).

10. The curable resin according claim 1, wherein a dielectric loss tangent calculated according to a measurement method comprising the following (i) to (iii) is 0.010 or less:

(i) preparing a cured product of a resin composition containing the curable resin, and measuring the dielectric loss tangent at 10 GHz of the cured product;

(ii) conducting the same measurement as in the item (i) on a plurality of cured products with each component content of the resin composition changed; and (iii) extrapolating the measurement results in the items (i) and (ii) to calculate the dielectric loss tangent of the curable resin alone.

11. The curable resin according to claim 1, wherein the structural unit represented by the formula (2) is derived from a dihydroxy compound containing a norbornane-based backbone.

12. A cured product of the curable resin according to claim 1.

13. A resin composition comprising the curable resin according to claim 1.

14. The resin composition according to claim 13, wherein a content of the curable resin is 1.0 part by mass or more relative to 100 parts by mass of the resin component.

15. A method for producing the curable resin according to claim 1, comprising reacting at least one of a compound represented by the following formula (4) and a compound represented by the following formula (4'), a compound represented by the following formula (5), and a compound represented by the following formula (6)

(4)

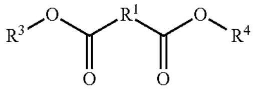

(4')

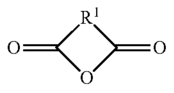

(5)

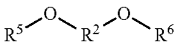

(6)

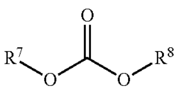

wherein in the formula (4), $R^1$ is the divalent group having one or more of at least one of an ethylenic double bond and an acetylenic triple bond, and $R^3$ and $R^4$ are each independently a hydrogen atom or a monovalent hydrocarbon group having 1 to 7 carbon atoms;

in the formula (4'), $R^1$ is defined in the same manner as $R^1$ in the formula (4);

in the formula (5), $R^2$ is the divalent group having an alicyclic structure, and $R^5$ and $R^6$ are each independently a hydrogen atom or a monovalent hydrocarbon group having 1 to 7 carbon atoms; and in the formula (6), $R^7$ and $R^8$ are each independently an optional substituent.

16. The method for producing the curable resin according to claim 15, comprising:

reacting the compound represented by the formula (5) with at least one of the compound represented by the formula (4) and the compound represented by the formula (4') at a molar equivalent less than that of the compound represented by the formula (5); and reacting a resulting product of the reacted compound represented by the formula (6).

17. The resin composition according to claim 13, being used as an electronic material.

18. An electronic component comprising a cured product of the resin composition according to claim 13.

19. A fiber-reinforced composite material comprising the resin composition according to claim 13 and a reinforcing fiber.

20. A fiber-reinforced formed article being a cured product of the fiber- reinforced composite material according to claim 19.

21. A semiconductor sealing material comprising the resin composition according to claim 13 and an inorganic filler.

22. A semiconductor device comprising a cured product of the semiconductor sealing material according to claim 21.

23. A prepreg comprising a base material and the resin composition according to claim 13 impregnated into or applied to the base material.

24. A laminate comprising the prepreg according to claim 23.

25. A circuit board comprising the laminate according to claim 24 and a metal foil disposed on one or both sides of the laminate.

26. A buildup film comprising a cured product of the resin composition according to claim 13 and a base material film.

* * * * *